United States Patent
Kamiwaki et al.

(10) Patent No.: US 12,209,204 B2
(45) Date of Patent: Jan. 28, 2025

(54) METHOD FOR PRODUCING PRESSURE-RESPONSIVE PARTICLES, METHOD FOR PRODUCING PRINTED MATERIAL, METHOD FOR PRODUCING SHEET FOR PRODUCING PRINTED MATERIAL, AND PRESSURE-RESPONSIVE PARTICLES

(71) Applicant: FUJIFILM Business Innovation Corp., Tokyo (JP)

(72) Inventors: Satoshi Kamiwaki, Kanagawa (JP);
Sumiaki Yamasaki, Kanagawa (JP);
Takeshi Iwanaga, Kanagawa (JP);
Kiyohiro Yamanaka, Kanagawa (JP);
Satoshi Inoue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 454 days.

(21) Appl. No.: 17/509,222

(22) Filed: Oct. 25, 2021

(65) Prior Publication Data
US 2022/0306913 A1 Sep. 29, 2022

(30) Foreign Application Priority Data
Mar. 26, 2021 (JP) .................................. 2021-054291

(51) Int. Cl.
*C09J 125/08* (2006.01)
*C08K 3/36* (2006.01)
(Continued)

(52) U.S. Cl.
CPC .............. *C09J 125/08* (2013.01); *C08K 3/36* (2013.01); *C09J 5/06* (2013.01); *C09J 7/385* (2018.01);
(Continued)

(58) Field of Classification Search
None
See application file for complete search history.

(56) References Cited

U.S. PATENT DOCUMENTS

| | | | |
|---|---|---|---|
| 2008/0063970 A1* | 3/2008 | Kikawa .............. | G03G 9/09357 430/110.2 |
| 2019/0292412 A1* | 9/2019 | Yamasaki ................. | C09J 4/06 |
| 2021/0017424 A1 | 1/2021 | Ishizuka et al. | |

FOREIGN PATENT DOCUMENTS

| | | |
|---|---|---|
| JP | 2018-053220 A | 4/2018 |
| JP | 2021-017465 A | 2/2021 |

OTHER PUBLICATIONS

Extended European Search Report issued May 3, 2022 in European Application No. 21211633.9.

* cited by examiner

*Primary Examiner* — Megan McCulley
(74) *Attorney, Agent, or Firm* — Sughrue Mion, PLLC

(57) ABSTRACT

A method for producing pressure-responsive particles includes: adding an aggregating agent to a dispersion containing composite resin particles containing a styrene-based resin including a styrene compound and a vinyl monomer other than the styrene compound as polymer components and a (meth)acrylic acid ester-based resin including a (meth) acrylic acid ester compound as a polymer component to aggregate the composite resin particles so as to form aggregated particles A; forming a shell by adding an aggregating agent and styrene-based resin particles containing a styrene compound and a vinyl monomer other than the styrene compound as polymer components to a dispersion containing the aggregated particles A to aggregate the styrene-based resin particles so as to form aggregated particles B; and heating and fusing the aggregated particles B to form pressure-responsive particles.

18 Claims, 3 Drawing Sheets

(51) Int. Cl.
    *C09J 5/06*           (2006.01)
    *C09J 7/38*           (2018.01)
    *C09J 133/08*       (2006.01)
    *B42D 15/04*        (2006.01)
    *C09J 11/04*        (2006.01)

(52) U.S. Cl.
    CPC ............ *C09J 133/08* (2013.01); *B42D 15/04* (2013.01); *C09J 11/04* (2013.01)

METHOD FOR PRODUCING PRESSURE-RESPONSIVE PARTICLES, METHOD FOR PRODUCING PRINTED MATERIAL, METHOD FOR PRODUCING SHEET FOR PRODUCING PRINTED MATERIAL, AND PRESSURE-RESPONSIVE PARTICLES

CROSS-REFERENCE TO RELATED APPLICATIONS

This application is based on and claims priority under 35 USC 119 from Japanese Patent Application No. 2021-054291 filed Mar. 26, 2021.

BACKGROUND

(i) Technical Field

The present disclosure relates to a method for producing pressure-responsive particles, a method for producing a printed material, a method for producing a sheet for producing a printed material, and pressure-responsive particles.

(ii) Related Art

Japanese Unexamined Patent Application Publication No. 2018-053220 discloses a releasable sheet that allows opposing surfaces thereof to be releasably bonded to each other. The releasable sheet includes a substrate sheet, a pressure-sensitive adhesive layer on at least one surface of the substrate sheet, and a surface layer on a surface of the pressure-sensitive adhesive layer. The pressure-sensitive adhesive layer contains an adhesive base containing a natural rubber-based material. The surface layer contains at least one selected from the group consisting of cellulose nanofibers, chitin nanofibers, and chitosan nanofibers.

Japanese Unexamined Patent Application Publication No. 2021-017465 discloses an adhesive material containing a styrene-based resin containing styrene and a vinyl monomer other than styrene as polymer components and a (meth)acrylic acid ester-based resin containing at least two (meth)acrylic acid esters as polymer components. The mass percentage of the (meth)acrylic acid esters relative to the total mass of the polymer components of the (meth)acrylic acid ester-based resin is 90 mass % or more. The mass ratio of the styrene-based resin to the (meth)acrylic acid ester-based resin is from 80:20 to 20:80. The adhesive material contains resin particles having at least two glass transition temperatures. The lowest glass transition temperature is −30° C. or lower, and the highest glass transition temperature is 30° C. or higher.

SUMMARY

Aspects of non-limiting embodiments of the present disclosure relate to a method for producing pressure-responsive particles including: an aggregating step of adding an aggregating agent to a dispersion containing composite resin particles containing a styrene-based resin including a styrene compound and a vinyl monomer other than the styrene compound as polymer components and a (meth)acrylic acid ester-based resin including a (meth)acrylic acid ester compound as a polymer component to cause aggregation so as to form aggregated particles A; a shell forming step of adding an aggregating agent and styrene-based resin particles containing a styrene compound and a vinyl monomer other than the styrene compound to a dispersion containing the aggregated particles A to cause aggregation so as to form aggregated particles B; and a fusing step of heating and fusing the aggregated particles B to form pressure-responsive particles. This method produces pressure-responsive particles that may have better tackiness at the time of pressure bonding and provide higher dispersion storage stability and that may generate less aggregates and fusion-bonded materials than a method in which the amount of the aggregating agent added in the shell forming step is less than 0.1 mass % or more than 1.0 mass % relative to the total mass of the composite resin particles or the mass ratio of the styrene-based resin to the (meth)acrylic acid ester-based resin in the pressure-responsive particles is from more than 80:less than 20 to 100:0 or from 0:100 to less than 20:more than 80.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing pressure-responsive particles including: adding an aggregating agent to a dispersion containing composite resin particles containing a styrene-based resin including a styrene compound and a vinyl monomer other than the styrene compound as polymer components and a (meth)acrylic acid ester-based resin including a (meth)acrylic acid ester compound as a polymer component to aggregate the composite resin particles so as to form aggregated particles A; forming a shell by adding an aggregating agent and styrene-based resin particles containing a styrene compound and a vinyl monomer other than the styrene compound as polymer components to a dispersion containing the aggregated particles A to aggregate the styrene-based resin particles so as to form aggregated particles B; and heating and fusing the aggregated particles B to form pressure-responsive particles, wherein an amount of the styrene-based resin particles added in the formation of the shell is 5 mass % or more and 40 mass % or less relative to a total mass of the composite resin particles, an amount of the aggregating agent added in the formation of the shell is 0.1 mass % or more and 1.0 mass % or less relative to the total mass of the composite resin particles, a mass ratio of the styrene-based resin to the (meth)acrylic acid ester-based resin in the pressure-responsive particles is from 80:20 to 20:80, and a difference between the lowest glass transition temperature and the highest glass transition temperature of resins contained in the pressure-responsive particles is 30° C. or more.

BRIEF DESCRIPTION OF THE DRAWINGS

Exemplary embodiments of the present disclosure will be described in detail based on the following figures, wherein.

DETAILED DESCRIPTION

Figure 1:
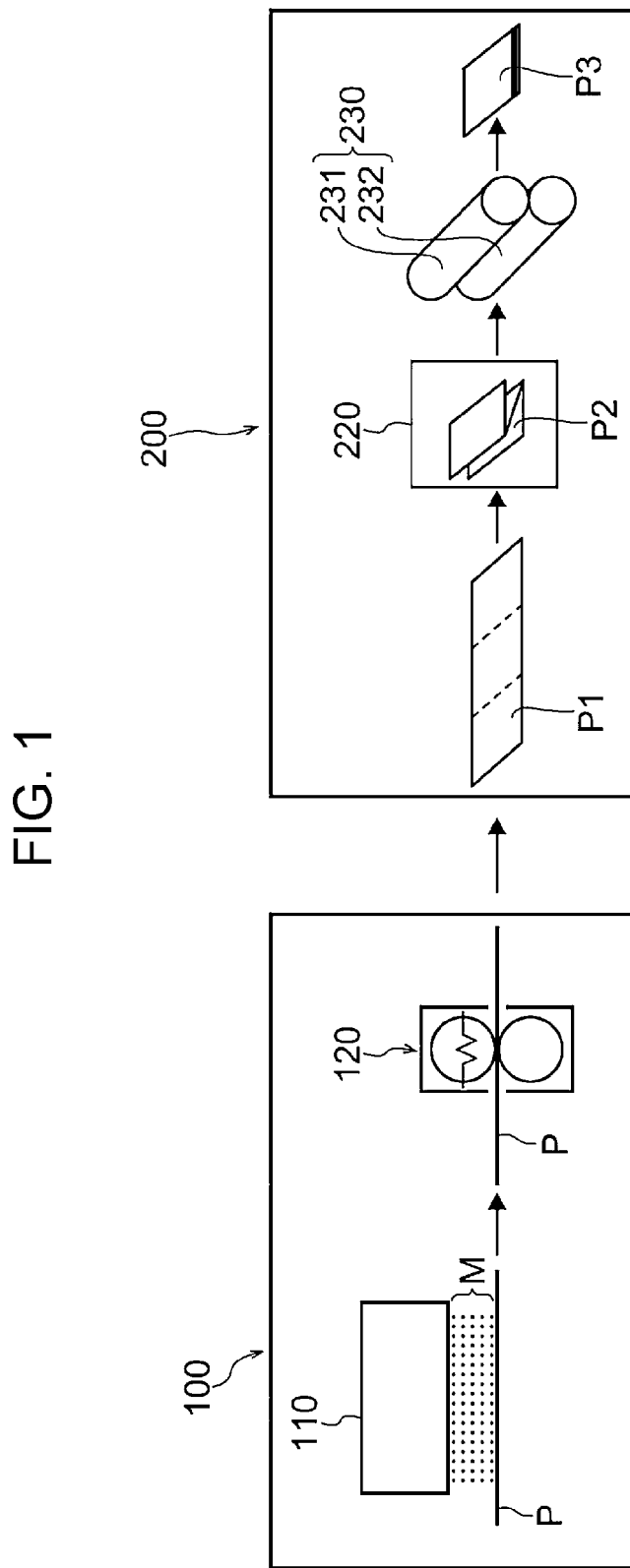
FIG. 1 is a schematic view of one example of a printed material producing apparatus according to an exemplary embodiment.

Exemplary embodiments of the present disclosure will be described below. The following description and Examples are for illustrating the exemplary embodiments, but are not intended to limit the scope of the exemplary embodiments.

The numerical ranges expressed by using "to" in the present disclosure indicate ranges including the numerical values before and after "to" as the minimum value and the maximum value.

In the numerical ranges described stepwise in the present disclosure, the upper limit or the lower limit of one numerical range may be replaced by the upper limit or the lower limit of another numerical range. The upper limit or lower limit of any numerical range described in the present disclosure may be replaced by a value described in Examples.

In the present disclosure, the term "step" includes not only an independent step but also a step that cannot be clearly distinguished from other steps but may accomplish an intended purpose.

In the description of exemplary embodiments with reference to the drawings in the present disclosure, the structures of the exemplary embodiments are not limited to the structures illustrated in the drawings. The sizes of members in each figure are schematic, and the relative relationship between the sizes of the members is not limited to what is illustrated.

In the present disclosure, each component may include two or more corresponding substances. In the present disclosure, the amount of each component in a composition refers to, when there are two or more substances corresponding to each component in the composition, the total amount of the substances present in the composition, unless otherwise specified.

In the present disclosure, each component may include two or more types of particles corresponding to each component. The particle size of each component refers to, when there are two or more types of particles corresponding to each component in the composition, the particle size of a mixture of two or more types of particles present in the composition, unless otherwise specified.

In the present disclosure, the term "(meth)acrylic" refers to both "acrylic" and "methacrylic".

In the present disclosure, the "toner for electrostatic charge image development" is also referred to simply as "toner", and the "electrostatic charge image developer" is also referred to simply as a "developer".

In the present disclosure, a printed material formed by folding a recording medium and bonding the opposing surfaces of the folded recording medium to each other or a printed material formed by stacking two or more recording media on top of each other and bonding the opposing surfaces of the stacked recording media to each other is referred to as a "pressure-bonded printed material".

Method for Producing Pressure-Responsive Particles

A method for producing pressure-responsive particles according to an exemplary embodiment includes: an aggregating step of adding an aggregating agent to a dispersion containing composite resin particles containing a styrene-based resin including a styrene compound and a vinyl monomer other than the styrene compound as polymer components and a (meth)acrylic acid ester-based resin including a (meth)acrylic acid ester compound as a polymer component to cause aggregation so as to form aggregated particles A; a shell forming step of adding an aggregating agent and styrene-based resin particles containing a styrene compound and a vinyl monomer other than the styrene compound to a dispersion containing the aggregated particles A to cause aggregation so as to form aggregated particles B; and a fusing step of heating and fusing the aggregated particles B to form pressure-responsive particles.

The amount of the styrene-based resin particles added in the shell forming step is 5 mass % or more and 40 mass % or less relative to the total mass of the composite resin particles. The amount of the aggregating agent added in the shell forming step is 0.1 mass % or more and 1.0 mass % or less relative to the total mass of the composite resin particles. The mass ratio of the styrene-based resin to the (meth)acrylic acid ester-based resin in the pressure-responsive particles is from 80:20 to 20:80. A difference between the lowest glass transition temperature and the highest glass transition temperature of resins contained in the pressure-responsive particles is 30° C. or more.

The pressure-responsive particles according to the exemplary embodiment are produced by the method for producing pressure-responsive particles according to the exemplary embodiment.

In the related art, crimped postcards for sales promotion use UV-curable varnish (UV varnish), and crimped postcards for confidential purposes use natural rubber-based glue. For both types of postcards, the varnish or glue coating process is complicated, and much effort has been directed toward dealing with odors and washing the coating device. For this, pressure-responsive particles replacing such varnish or glue have been studied. Pressure-responsive particles can be taken out as powder as long as the exposure of the (meth)acrylic acid ester-based resin on the surface is prevented, and the particle size is controlled by using, as a pressure-responsive material, a resin containing a (meth)acrylic acid ester-based resin and a styrene-based resin containing styrene and a vinyl monomer other than styrene as polymer components, wherein the mass ratio of the styrene-based resin to the (meth)acrylic acid ester-based resin is from 80:20 to 20:80, and a difference between the lowest glass transition temperature and the highest glass transition temperature is 30° C. or more.

When pressure-responsive particles are used in a pressure-sensitive adhesive, the tackiness of the pressure-responsive particles degrades with time to reduce the shelf life of pre-glued paper for crimped postcards. It is thus difficult to manage the inventory of pre-glued paper. In contrast, the presence of areas with locally high tackiness causes sheet tearing at the time of peeling after storage in a high humidity environment.

The presence of a small area of the core exposed portion on the produced pressure-responsive particles causes aggregation of the pressure-responsive particles and fusion-bonding of the pressure-responsive particles to members in the process of, for example, electrostatic coating of sheets of paper with the pressure-responsive particles.

The method for producing pressure-responsive particles according to the exemplary embodiment includes a shell forming step of adding an aggregating agent and styrene-based resin particles containing a styrene compound and a vinyl monomer other than the styrene compound as polymer components to cause aggregation so as to form aggregated particles B, wherein the amount of the aggregating agent added in the shell forming step is 0.1 mass % or more and 1.0 mass % or less relative to the total mass of the composite resin particles. In this method, the core and the shell firmly adhere to each other in the pressure-responsive particles after completion of aggregation to reduce the area of the core exposed portion. The pressure-responsive particles may thus provide high dispersion storage stability while maintaining tackiness at the time of pressure bonding and may generate less aggregates and fusion-bonded materials.

The pressure-responsive particles according to the exemplary embodiment undergo pressure-induced phase transition because the pressure-responsive particles exhibit the following thermal properties: "having at least two glass transition temperatures, wherein a difference between the lowest glass transition temperature and the highest glass transition temperature is 30° C. or higher". In the exemplary embodiment, the pressure-responsive particles that undergo pressure-induced phase transition mean pressure-responsive particles that satisfy Formula 1 below.

$$10° C. \leq T1 - T2 \qquad \text{Formula 1}$$

In Formula 1, T1 is a temperature corresponding to a viscosity of 10,000 Pas at a pressure of 1 MPa, and T2 is a temperature corresponding to a viscosity of 10,000 Pas at a pressure of 10 MPa. The temperature T1 and the temperature T2 are determined as described below.

In the method for producing pressure-responsive particles according to the exemplary embodiment, the mass ratio of the styrene-based resin to the (meth)acrylic acid ester-based resin in the pressure-responsive particles is from 80:20 to 20:80, preferably from 70:30 to 30:70, more preferably from 60:40 to 40:60 in view of the tackiness at the time of pressure bonding and the storage stability of the dispersion and to prevent generation of aggregates and fusion-bonded materials.

The styrene-based resin contained in the pressure-responsive particles contains not only the styrene-based resin contained in the composite resin particles but also, when the method includes a shell forming step, the styrene-based resin added in the shell forming step.

In the method for producing pressure-responsive particles according to the exemplary embodiment, a difference between the lowest glass transition temperature and the highest glass transition temperature of resins contained in the pressure-responsive particles is 30° C. or more, preferably 40° C. or more, more preferably 60° C. or more, still more preferably 60° C. or more and 200° C. or less, yet still more preferably 80° C. or more and 150° C. or less in view of the tackiness at the time of pressure bonding and the storage stability of the dispersion and to prevent generation of aggregates and fusion-bonded materials.

The pressure-responsive particles have at least two glass transition temperatures, one of which may be the glass transition temperature of the styrene-based resin, and the other may be the glass transition temperature of the (meth) acrylic acid ester-based resin.

The lowest glass transition temperature in the composite resin particles may be the glass transition temperature of the (meth)acrylic acid ester-based resin.

The highest glass transition temperature may be the glass transition temperature of the styrene-based resin contained in the pressure-responsive particles. In some exemplary embodiments, the lowest glass transition temperature is the glass transition temperature of the (meth)acrylic acid ester-based resin contained in the pressure-responsive particles, and the highest glass transition temperature is the glass transition temperature of the styrene-based resin contained in the pressure-responsive particles.

The lowest glass transition temperature and the highest glass transition temperature are of resins present at 1 mass % or more relative to the total mass of the resins contained in the pressure-responsive particles among the resins contained in the pressure-responsive particles.

The pressure-responsive particles may have three or more glass transition temperatures or may have two glass transition temperatures. Examples of the form of the pressure-responsive particles having two glass transition temperatures include pressure-responsive particles containing only the styrene-based resin and the (meth)acrylic acid ester-based resin; and pressure-responsive particles containing a small amount of resin other than the styrene-based resin and the (meth)acrylic acid ester-based resin (e.g., the amount of other resin is 5 mass % or less relative to the total mass of the pressure-responsive particles).

In the present disclosure, the glass transition temperatures of the resins are determined from differential scanning calorimetry curves (DSC curves) obtained by differential scanning calorimetry (DSC). More specifically, the glass transition temperature is determined from "extrapolated glass transition onset temperature" described in the method for determining a glass transition temperature in "Testing Methods for Transition Temperatures of Plastics" in JIS K7121:1987.

The glass transition temperature of the styrene-based resin contained in the pressure-responsive particles is preferably 30° C. or higher, more preferably 40° C. or higher, still more preferably 50° C. or higher in order to prevent fluidization of the composite resin particles under no pressure, and preferably 110° C. or lower, more preferably 100° C. or lower, still more preferably 90° C. or lower in order to form composite resin particles that easily undergo pressure-induced phase transition.

The glass transition temperature of the (meth)acrylic acid ester-based resin contained in the pressure-responsive particles is preferably 10° C. or lower, more preferably 0° C. or lower, still more preferably −10° C. or lower in order to form pressure-responsive resin particles that easily undergo pressure-induced phase transition, and preferably −90° C. or higher, more preferably −80° C. or higher, still more preferably −70° C. or higher in order to prevent fluidization of the pressure-responsive resin particles under no pressure.

Aggregating Step

The method for producing pressure-responsive particles according to the exemplary embodiment includes an aggregating step of adding an aggregating agent to a dispersion containing composite resin particles containing a styrene-based resin including a styrene compound and a vinyl monomer other than the styrene compound as polymer components and a (meth)acrylic acid ester-based resin including a (meth)acrylic acid ester compound as a polymer component to cause aggregation so as to form aggregated particles A.

The details of the styrene-based resin and the (meth) acrylic acid ester-based resin will be described below.

In the method for producing pressure-responsive particles according to the exemplary embodiment, the pressure-responsive particles are produced by an aggregation-coalescence method.

In the aggregating step, the composite resin particles aggregate in a dispersion containing the composite resin particles to form aggregated particles A having a size closer to the intended size of the pressure-responsive particles.

Specifically, the aggregated particles are formed, for example, as follows: adding an aggregating agent to a composite resin particle dispersion and adjusting the pH of the composite resin particle dispersion to the acid side (e.g., pH 2 or higher and pH 5 or lower), and adding a dispersion stabilizer as desired; and then heating the dispersion to a temperature close to the glass transition temperature of the styrene-based resin (specifically, for example, the glass transition temperature of the styrene-based resin −10° C. or higher and the glass transition temperature +15° C. or lower) to aggregate the composite resin particles.

The aggregating step may involve adding an aggregating agent to the composite resin particle dispersion at room temperature (e.g., 25° C.) under stirring with a rotary shear homogenizer and adjusting the pH of the composite resin particle dispersion to the acid side (e.g., pH 2 or higher and pH 5 or lower), and heating the dispersion after adding a dispersion stabilizer as desired.

Examples of the aggregating agent include surfactants having polarity opposite to the polarity of a surfactant contained in the dispersion composite resin particle dispersion, inorganic metal salts, and divalent or higher valent metal complexes. The use of a metal complex as an aggregating agent reduces the amount of the surfactant used and improves charging characteristics.

Examples of inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

Of these, aluminum-containing aggregating agents are preferred, aluminum chloride, aluminum sulfate, polyaluminum chloride, or polyaluminum hydroxide are more preferred, and aluminum sulfate is still more preferred in view of the tackiness at the time of pressure bonding and the storage stability of the dispersion and to prevent generation of aggregates and fusion-bonded materials.

The amount of the aggregating agent added is not limited, but preferably 0.1 parts by mass or more and 5 parts by mass or less, more preferably 0.2 parts by mass or more and 2 parts by mass or less, relative to 100 parts by mass of the composite resin particles.

The volume average particle size of the composite resin particles is preferably 140 nm or more and 350 nm or less, more preferably 180 nm or more and 320 nm or less, still more preferably 200 nm or more and 300 nm or less.

The dispersion containing the composite resin particles in the aggregating step is preferably a water-based dispersion, more preferably a water dispersion.

The amount of the composite resin particles in the dispersion containing the composite resin particles is preferably 20 mass % or more and 50 mass % or less, more preferably 30 mass % or more and 40 mass % or less.

In the aggregating step, silica particles may further be added in view of the tackiness at the time of pressure bonding and the storage stability of the dispersion.

When a dispersion containing silica particles is added, the silica particles catch (trap) the aggregating agent after completion of aggregation in the shell forming step to prevent the aggregating agent from remaining in the pressure-responsive particles. Thus, the aggregating agent does not inhibit mixing of the styrene-based resin and the (meth) acrylic acid ester-based resin during formation of the pressure-responsive particles, which may provide high dispersion storage stability while maintaining tackiness at the time of pressure bonding. In particular, it is effective to remove an excess of the aggregating agent since the aggregating agent is added in the shell forming step.

The silica particles are preferably added by using a dispersion containing silica particles.

The dispersion containing silica particles is preferably a dispersion of silica particles in a water-based medium, more preferably a dispersion of silica particles in water.

Examples of the dispersion medium include water-based media including water and alcohols. These media may be used alone or in combination of two or more.

The amount of the silica particles added in the aggregating step is preferably 0.5 mass % or more and 10 mass % or less, more preferably 1 mass % or more and 9 mass % or less, still more preferably 2 mass % or more and 8 mass % or less relative to the total mass of the composite resin particles in view of the tackiness at the time of pressure bonding and the storage stability of the dispersion.

The solid content of the dispersion containing the silica particles is not limited, but preferably 1 mass % or more and 50 mass % or less, more preferably 2 mass % or more and 40 mass % or less.

In view of the tackiness at the time of pressure bonding and the storage stability of the dispersion, the arithmetic mean particle size of the silica particles is preferably 5 nm or more and 100 nm or less, more preferably 6 nm or more and 80 nm or less, still more preferably 7 nm or more and 40 nm or less, yet still more preferably 7 nm or more and 25 nm or less.

The arithmetic mean particle size of the silica particles in the exemplary embodiment is determined by capturing the images of the silica particles through observation with a scanning electron microscope (S-4100 available from Hitachi, Ltd). The captured images are loaded into an image analyzer (LUZEXIII available from Nireco Corporation). The area of each particle is determined by image analysis, and the equivalent circular diameter (nm) is calculated from the area. The arithmetic mean of the equivalent circular diameters of 100 or more particles is taken as an arithmetic mean particle size.

Shell Forming Step

The method for producing pressure-responsive particles according to the exemplary embodiment includes a shell forming step of adding an aggregating agent and styrene-based resin particles containing a styrene compound and a vinyl monomer other than the styrene compound as polymer components to a dispersion containing the aggregated particles A formed in the aggregating step to cause aggregation so as to form aggregated particles B. The amount of the styrene-based resin particles added in the shell forming step is 5 mass % or more and 40 mass % or less relative to the total mass of the composite resin particles. The amount of the aggregating agent added in the shell forming step is 0.1 mass % or more and 1.0 mass % or less relative to the total mass of the composite resin particles.

Specifically, for example, an aggregating agent and a styrene-based resin particle dispersion are added to a dispersion containing the aggregated particles A after the aggregating step, and the dispersion mixture is then heated to a temperature close to the glass transition temperature of the styrene-based resin (specifically, for example, the glass transition temperature of the styrene-based resin −10° C. or higher and the glass transition temperature +15° C. or lower) to aggregate the styrene-based resin particles on the surfaces of the aggregated particles A so as to form aggregated particles B having the styrene-based resin particles on the surfaces.

The styrene-based resin particles are preferably added by using the styrene-based resin particle dispersion in the shell forming step. An exemplary aspect of the styrene-based resin particle dispersion in the shell forming step is the same as an exemplary aspect of the styrene-based resin particle dispersion in the aggregating step.

The amount of the styrene-based resin particles added in the shell forming step is 5 mass % or more and 40 mass % or less, preferably 10 mass % or more and 30 mass % or less, more preferably 12 mass % or more and 25 mass % or less, still more preferably 15 mass % or more and 20 mass % or less relative to the total mass of the composite resin particles used in the aggregating step in view of the tackiness at the time of pressure bonding and the storage stability of the dispersion and to prevent generation of aggregates and fusion-bonded materials.

The amount of the aggregating agent in the shell forming step is 0.1 mass % or more and 1.0 mass % or less, preferably 0.3 mass % or more and 0.98 mass % or less, more preferably 0.4 mass % or more and 0.8 mass % or less relative to the total mass of the composite resin particles used in the aggregating step in view of the tackiness at the time of pressure bonding and the storage stability of the dispersion and to prevent generation of aggregates and fusion-bonded materials.

In the shell forming step, the styrene-based resin particles and the aggregating agent may be added after the liquid temperature of the dispersion containing the aggregated particles A is lowered after the aggregating step in view of the tackiness at the time of pressure bonding and the storage stability of the dispersion and to prevent generation of aggregates and fusion-bonded materials. The liquid temperature of the dispersion may be lowered by 5° C. or more.

An exemplary aspect of the aggregating agent used in the shell forming step is the same as an exemplary aspect of the aggregating agent used in the aggregating step.

The aggregating agent used in the shell forming step may be the same as or different from the aggregating agent used in the aggregating step. In some exemplary embodiments, the aggregating agent used in the shell forming step is different from the aggregating agent used in the aggregating step.

The pressure-responsive particles having a core-shell structure obtained after the shell forming step and the fusing step have a shell layer containing a styrene-based resin. In addition to the styrene-based resin particle dispersion, a resin particle dispersion in which another type of resin particles are dispersed may be used to form a shell layer containing another type of resin particles.

Fusing Step

The method for producing pressure-responsive particles according to the exemplary embodiment includes a fusing step of heating and fusing the aggregated particles B to form pressure-responsive particles.

In the fusing step, the aggregated particle dispersion in which the aggregated particles B are dispersed is heated to, for example, a temperature equal to or higher than the glass transition temperature of the styrene resin particles (e.g., a temperature equal to or higher than the glass transition temperature of the styrene resin by 30° C. to 50° C.) to fuse and coalesce the aggregated particles into pressure-responsive particles.

After completion of the fusing step, the pressure-responsive particles formed in the dispersion are subjected to a known washing step, a known solid-liquid separation step, and a known drying step to provide dry pressure-responsive particles. The washing step may involve sufficient displacement washing with ion exchange water in view of charging characteristics. The solid-liquid separation step may involve, for example, suction filtration or pressure filtration in view of productivity. The drying step may involve, for example, freeze drying, flush drying, fluidized bed drying, or vibratory fluidized bed drying in view of productivity.

The pressure-responsive particles may be produced by, for example, adding external additives to the obtained dry pressure-responsive particles and mixing them. Mixing may be performed with, for example, a V-blender, a Henschel mixer, or a Lodige mixer. In addition, coarse particles in the pressure-responsive particles may be removed with, for example, a vibratory sifter, or a wind sifter, as desired.

The pressure-responsive particles may contain a colorant, a release agent, and other additives as desired. When the pressure-responsive particles contain a colorant and a release agent, the aggregating step is performed by using a mixture of a composite resin particle dispersion, a colorant particle dispersion, and a release agent particle dispersion, followed by the fusing step. The colorant particle dispersion and the release agent particle dispersion can be prepared by, for example, mixing materials and then subjecting the mixture to a dispersion treatment using a known disperser.

The method for producing pressure-responsive particles according to the exemplary embodiment may further include a polymerization step B of polymerizing a styrene compound and a vinyl monomer other than the styrene compound to form a styrene-based resin, and a polymerization step B of polymerizing a (meth)acrylic acid ester compound in the presence of the styrene-based resin obtained in the polymerization step A to form composite resin particles containing the styrene-based resin and a (meth)acrylic acid ester-based resin.

Polymerization Step A

The method for producing a pressure-responsive particle dispersion according to the exemplary embodiment may further include a polymerization step A of polymerizing a styrene compound and a vinyl monomer other than the styrene compound to form a styrene-based resin.

The polymerization in the polymerization step A is not limited and may be emulsion polymerization.

The method for producing a composite resin particle dispersion may involve emulsion polymerization.

The polymerization step A is preferably a step of forming styrene-based resin particles, more preferably a step of forming a styrene-based resin particle dispersion.

One method for dispersing styrene-based resin particles in a dispersion medium involves, for example, stirring a mixture of a styrene-based resin and a dispersion medium with a rotary shear homogenizer, a ball mill having media, a sand mill, or Dyno-Mill to form a dispersion.

Another method for dispersing styrene-based resin particles in a dispersion medium is emulsion polymerization. Specifically, emulsion polymerization involves mixing polymer components of the styrene-based resin with a chain transfer agent or a polymerization initiator, then further mixing the mixture with a water-based medium containing a surfactant under stirring to form an emulsion, and polymerizing a styrene-based resin in the emulsion. In this case, the chain transfer agent is preferably a thiol compound, more preferably dodecane thiol.

Examples of the dispersion medium include water-based media described above.

Examples of the surfactant include anionic surfactants, such as sulfate ester salts, sulfonate salts, phosphate esters, and soaps; cationic surfactants, such as amine salts and quaternary ammonium salts; and nonionic surfactants, such as polyethylene glycols, alkylphenol ethylene oxide adducts, and polyhydric alcohols. A nonionic surfactant may be used in combination with an anionic surfactant or a cationic surfactant. Of these surfactants, an anionic surfactant may be used. The surfactant may be used alone or in combination of two or more.

Examples of the polymerization initiator include, but are not limited to, known photopolymerization initiators and known thermal polymerization initiators.

Of these, thermal polymerization initiators are preferred, peroxides are more preferred, and ammonium persulfate is still more preferred.

The polymerization temperature and the polymerization time are not limited and appropriately selected to according to, for example, the monomers and the polymerization initiator used.

In the polymerization step A, the volume average particle size of the styrene-based resin particles to be dispersed in the styrene-based resin particle dispersion is preferably 100 nm or more and 250 nm or less, more preferably 120 nm or more and 220 nm or less, still more preferably 150 nm or more and 200 nm or less.

The volume average particle size (D50v) of the resin particles contained in the resin particle dispersion refers to the particle size at 50% cumulative volume from the smallest particle size in the volume-based particle size distribution obtained by measuring particle sizes with a laser diffraction particle size distribution analyzer (e.g., LA-700 available from Horiba Ltd).

The amount of the styrene-based resin particles in the styrene-based resin particle dispersion is not limited, but preferably 30 mass % or more and 60 mass % or less, more preferably 40 mass % or more and 50 mass % or less.

Polymerization Step B

The method for producing a pressure-responsive particle dispersion according to the exemplary embodiment may further include a polymerization step B of polymerizing a (meth)acrylic acid ester compound in the presence of the styrene-based resin obtained in the polymerization step A to form composite resin particles containing the styrene-based resin and a (meth)acrylic acid ester-based resin.

The polymerization step B may be a step of forming a composite resin particle dispersion.

One method for dispersing composite resin particles in a dispersion medium involves, for example, stirring a mixture of a styrene-based resin and a dispersion medium with a rotary shear homogenizer, a ball mill having media, a sand mill, or Dyno-Mill to form a dispersion.

Another method for dispersing the composite resin particles in a dispersion medium involves adding polymer components of the (meth)acrylic acid ester-based resin to a styrene-based resin particle dispersion and adding a water-based medium as desired. Next, while the dispersion is gently stirred, the temperature of the dispersion is raised to the glass transition temperature of the produced styrene-based resin or higher (e.g., a temperature higher than the glass transition temperature of the styrene-based resin by 10° C. to 30° C.). Next, while the temperature is maintained, a water-based medium containing a polymerization initiator is slowly added dropwise, and stirring is further continued for a long time in the range of 1 hour or more and 15 hours or less. In this case, ammonium persulfate may be used as a polymerization initiator.

Examples of the dispersion medium and the polymerization initiator may include those described above.

The polymerization step B may use a surfactant. Examples of the surfactant may include those described above.

The polymerization temperature and the polymerization time are not limited and appropriately selected to according to, for example, the monomers and the polymerization initiator used.

Although the details of the mechanism are unclear, the use of the above method may cause impregnation of the styrene-based resin particles with the monomers and the polymerization initiator to polymerize the (meth)acrylic acid ester inside the styrene-based resin particles. This method may produce composite resin particles in which the (meth)acrylic acid ester-based resin is contained in the styrene-based resin particles, in which the styrene-based resin and the (meth)acrylic acid ester-based resin form a microphase-separated structure.

The method for producing pressure-responsive particles according to the exemplary embodiment may include a known step other than the steps described above.

The details of the styrene-based resin and the (meth)acrylic acid ester-based resin in the exemplary embodiment will be described below.

Styrene-Based Resin

The styrene-based resin contained in the pressure-responsive particles contains a styrene compound and a vinyl monomer other than the styrene compound as polymer components.

The styrene compound used to synthesize the styrene-based resin may include styrene.

The mass percentage of styrene relative to the total mass of the polymer components of the styrene-based resin is preferably 60 mass % or more, more preferably 70 mass % or more, still more preferably 75 mass % or more in order to prevent fluidization of the pressure-responsive particles under no pressure, and preferably 95 mass % or less, more preferably 90 mass % or less, still more preferably 85 mass % or less in order to form pressure-responsive particles that easily undergo pressure-induced phase transition.

Examples of styrene compounds other than styrene used to synthesize the styrene-based resin include vinyl naphthalene; alkyl-substituted styrenes, such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes, such as p-phenylstyrene; alkoxy-substituted styrenes, such as p-methoxystyrene; halogen-substituted styrenes, such as p-chlorostyrene, 3,4-dichlorostyrene, p-fluorostyrene, and 2,5-difluorostyrene; and nitro-substituted styrenes, such as m-nitrostyrene, o-nitrostyrene, and p-nitrostyrene. The styrene compound may be used alone or in combination of two or more.

Examples of the vinyl monomer other than the styrene compound used to synthesize the styrene-based resin include an acrylic monomer.

The acrylic monomer may be at least one acrylic monomer selected from the group consisting of (meth)acrylic acid and (meth)acrylic acid ester compounds. Examples of (meth)acrylic acid ester compounds include (meth)acrylic acid alkyl ester compounds, (meth)acrylic acid carboxy-substituted alkyl ester compounds, (meth)acrylic acid hydroxy-substituted alkyl ester compounds, (meth)acrylic acid alkoxy-substituted alkyl ester compounds, and di(meth)acrylic acid ester compounds. The acrylic monomer may be used alone or in combination of two or more.

Examples of (meth)acrylic acid alkyl ester compounds include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, and isobornyl (meth)acrylate.

Examples of (meth)acrylic acid carboxy-substituted alkyl esters include 2-carboxyethyl (meth)acrylate.

Examples of (meth)acrylic acid hydroxy-substituted alkyl ester compounds include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Examples of (meth)acrylic acid alkoxy-substituted alkyl ester compounds include 2-methoxyethyl (meth)acrylate.

Examples of di(meth)acrylic acid ester compounds include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of (meth)acrylic acid ester compounds include 2-(diethylamino)ethyl (meth)acrylate, benzyl (meth)acrylate, and methoxy polyethylene glycol (meth)acrylate.

Examples of the vinyl monomer other than the styrene compound used to synthesize the styrene-based resin include (meth)acrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as isoprene, butene, and butadiene.

To form pressure-responsive particles that easily undergo pressure-induced phase transition, the styrene-based resin preferably contains a (meth)acrylic acid ester compound as a polymer component, more preferably contains a (meth)acrylic acid alkyl ester compound as a polymer component, still more preferably contains a (meth)acrylic acid alkyl ester compound with a C2-C10 alkyl group, yet still more preferably contains a (meth)acrylic acid alkyl ester compound with a C4-C8 alkyl group, yet still more preferably contains at least one of n-butyl acrylate and 2-ethylhexyl acrylate.

To form pressure-responsive particles that easily undergo pressure-induced phase transition, the vinyl monomer present at the highest mass percentage in the styrene-based resin among vinyl monomers other than styrene is preferably a (meth)acrylic acid ester, more preferably a (meth)acrylic acid alkyl ester compound, still more preferably a (meth)acrylic acid alkyl ester compound with a C2-C10 alkyl group, yet still more preferably n-butyl acrylate or 2-ethylhexyl acrylate.

The mass percentage of the (meth)acrylic acid ester compound relative to the total mass of the polymer components of the styrene-based resin is preferably 40 mass % or less, more preferably 30 mass % or less, still more preferably 25 mass % or less in order to prevent fluidization of the pressure-responsive particles under no pressure, and preferably 5 mass % or more, more preferably 10 mass % or more, still more preferably 15 mass % or more in order to facilitate the pressure-induced phase transition of the pressure-responsive particles. The (meth)acrylic acid ester compound is preferably a (meth)acrylic acid alkyl ester compound, more preferably a (meth)acrylic acid alkyl ester compound with a C2-C10 alkyl group, still more preferably a (meth)acrylic acid alkyl ester compound with a C4-C8 alkyl group.

The styrene-based resin may contain at least one of n-butyl acrylate and 2-ethylhexyl acrylate as a polymer component. The total amount of n-butyl acrylate and 2-ethylhexyl acrylate relative to the total amount of the polymer components of the styrene-based resin is preferably 40 mass % or less, more preferably 30 mass % or less, still more preferably 25 mass % or less in order to prevent fluidization of the pressure-responsive particles under no pressure, and preferably 5 mass % or more, more preferably 10 mass % or more, still more preferably 15 mass % or more in order to form pressure-responsive particles that easily undergo pressure-induced phase transition.

The weight average molecular weight of the styrene-based resin is preferably 10,000 or more, more preferably 20,000 or more, still more preferably 30,000 or more in order to prevent fluidization of the pressure-responsive particles under no pressure, and preferably 200,000 or less, more preferably 150,000 or less, still more preferably 100,000 or less in order to form pressure-responsive particles that easily undergo pressure-induced phase transition.

In the present disclosure, the weight average molecular weights of the resins are determined by gel permeation chromatography (GPC). The measurement of the molecular weights by GPC is carried out by using HLC-8120GPC available from Tosoh Corporation as a GPC system, TSKgel SuperHM-M (15 cm) available from Tosoh Corporation as a column, and tetrahydrofuran as a solvent. The weight average molecular weights of the resins are calculated from molecular weight calibration curves made by using a monodisperse polystyrene standard.

The glass transition temperature of the styrene-based resin is preferably 30° C. or higher, more preferably 40° C. or higher, still more preferably 50° C. or higher in order to prevent fluidization of the pressure-responsive particles under no pressure, and preferably 110° C. or lower, more preferably 100° C. or lower, still more preferably 90° C. or lower in order to form pressure-responsive particles that easily undergo pressure-induced phase transition. (Meth) acrylic Acid Ester-Based Resin The (meth)acrylic acid ester-based resin contained in the pressure-responsive particles may contain a (meth)acrylic acid ester compound as a polymer component.

The (meth)acrylic acid ester compound may be used alone or in combination of two or more. At least two (meth)acrylic acid esters may be contained as polymer components.

The mass percentage of the (meth)acrylic acid ester relative to the total mass of the polymer components of the (meth)acrylic acid ester-based resin is 90 mass % or more, more preferably 95 mass % or more, still more preferably 98 mass % or more, yet still more preferably 100 mass %.

Examples of (meth)acrylic acid ester compounds used to synthesize the (meth)acrylic acid ester-based resin include (meth)acrylic acid alkyl ester compounds, (meth)acrylic acid carboxy-substituted alkyl ester compounds, (meth) acrylic acid hydroxy-substituted alkyl ester compounds, (meth)acrylic acid alkoxy-substituted alkyl ester compounds, and di(meth)acrylic acid ester compounds.

Examples of (meth)acrylic acid alkyl ester compounds include methyl (meth)acrylate, ethyl (meth)acrylate, propyl (meth)acrylate, isopropyl (meth)acrylate, n-butyl (meth) acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, and isobornyl (meth)acrylate.

Examples of (meth)acrylic acid carboxy-substituted alkyl ester compounds include 2-carboxyethyl (meth)acrylate.

Examples of (meth)acrylic acid hydroxy-substituted alkyl ester compounds include 2-hydroxyethyl (meth)acrylate, 2-hydroxypropyl (meth)acrylate, 3-hydroxypropyl (meth) acrylate, 2-hydroxybutyl (meth)acrylate, 3-hydroxybutyl (meth)acrylate, and 4-hydroxybutyl (meth)acrylate.

Examples of (meth)acrylic acid alkoxy-substituted alkyl ester compounds include 2-methoxyethyl (meth)acrylate.

Examples of di(meth)acrylic acid ester compounds include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of (meth)acrylic acid ester compounds include 2-(diethylamino)ethyl (meth)acrylate, benzyl (meth)acrylate, and methoxy polyethylene glycol (meth)acrylate.

The (meth)acrylic acid ester compound used to synthesize the (meth)acrylic acid ester-based resin is preferably a (meth)acrylic acid alkyl ester compound, more preferably a (meth)acrylic acid alkyl ester compound with a C2-C10 alkyl group, still more preferably a (meth)acrylic acid alkyl ester compound with a C4-C8 alkyl group, yet still more preferably n-butyl acrylate or 2-ethylhexyl acrylate in order to form pressure-responsive particles that easily undergo pressure-induced phase transition and have good adhesiveness.

To form pressure-responsive particles that easily undergo pressure-induced phase transition, the styrene-based resin and the (meth)acrylic acid ester-based resin contained in the pressure-responsive particles may contain the same (meth)acrylic acid ester compound as a polymer component. In other words, to form pressure-responsive particles that easily undergo pressure-induced phase transition, the styrene-based resin and the (meth)acrylic acid ester-based resin contained in the pressure-responsive particles may each have a structural unit derived from the same (meth)acrylic acid ester compound.

Two (meth)acrylic acid ester compounds present at the highest two mass percentages among at least two (meth)acrylic acid ester compounds contained as polymer components in the (meth)acrylic acid ester-based resin may be (meth)acrylic acid alkyl ester compounds. The (meth)acrylic acid alkyl ester compounds are preferably (meth)acrylic acid alkyl ester compounds with a C2-C10 alkyl group, more preferably (meth)acrylic acid alkyl ester compounds with a C4-C8 alkyl group.

When two (meth)acrylic acid ester compounds present at the highest two mass percentages among at least two (meth)acrylic acid ester compounds contained as polymer components in the (meth)acrylic acid ester-based resin are (meth)acrylic acid alkyl ester compounds, a difference in number of carbon atoms between the alkyl groups of the two (meth)acrylic acid alkyl ester compounds is preferably 1 or more and 4 or less, more preferably 2 or more and 4 or less, still more preferably 3 or 4 in order to form pressure-responsive particles that easily undergo pressure-induced phase transition and have better tackiness.

To form pressure-responsive particles that easily undergo pressure-induced phase transition and have better tackiness, the (meth)acrylic acid ester-based resin preferably contains n-butyl acrylate and 2-ethylhexyl acrylate as polymer components, and more preferably two (meth)acrylic acid ester compounds present at the highest two mass percentages among at least two (meth)acrylic acid ester compounds contained as polymer components in the (meth)acrylic acid ester-based resin may be n-butyl acrylate and 2-ethylhexyl acrylate. The total amount of n-butyl acrylate and 2-ethylhexyl acrylate relative to the total amount of the polymer components of the (meth)acrylic acid ester-based resin is preferably 90 mass % or more, more preferably 95 mass % or more, still more preferably 98 mass % or more, yet still more preferably 100 mass %.

The (meth)acrylic acid ester-based resin may contain, as a polymer component, a vinyl monomer other than (meth)acrylic acid ester compounds. Examples of the vinyl monomer other than (meth)acrylic acid esters include (meth)acrylic acid; styrene; styrene-based monomers other than styrene; (meth)acrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as isoprene, butene, and butadiene. These vinyl monomers may be used alone or in combination of two or more.

When the (meth)acrylic acid ester-based resin contains, as a polymer component, a vinyl monomer other than (meth)acrylic acid ester compounds, the vinyl monomer other than (meth)acrylic acid ester compounds is preferably at least one of acrylic acid and methacrylic acid, more preferably acrylic acid.

The weight average molecular weight of the (meth)acrylic acid ester-based resin is preferably 10,000 or more, more preferably 20,000 or more, still more preferably 30,000 or more in order to prevent fluidization of the pressure-responsive particles under no pressure, and preferably 200,000 or less, more preferably 150,000 or less, still more preferably 100,000 or less in order to form pressure-responsive particles that easily undergo pressure-induced phase transition.

The glass transition temperature of the (meth)acrylic acid ester-based resin is preferably 10° C. or lower, more preferably 0° C. or lower, still more preferably −10° C. or lower in order to form pressure-responsive particles that easily undergo pressure-induced phase transition, and preferably −90° C. or higher, more preferably −80° C. or higher, still more preferably −70° C. or higher in order to prevent fluidization of the pressure-responsive particles under no pressure.

Other Resins

The pressure-responsive particles may contain, for example, polystyrene; and non-vinyl resins, such as epoxy resins, polyester resins, polyurethane resins, polyamide resins, cellulose resins, polyether resins, and modified rosins. These resins may be used alone or in combination of two or more.

Various Additives

The pressure-responsive particles may contain, as desired, colorants (e.g., pigments, dyes), release agents (e.g., hydrocarbon waxes; natural waxes, such as carnauba wax, rice wax, and candelilla wax; synthetic or mineral and petroleum waxes, such as montan wax; and ester waxes, such as waxes of fatty acid esters and montanic acid esters), and charge control agents.

When the pressure-responsive particles are transparent resin particles, the amount of colorant in the pressure-responsive particles relative to the total amount of the pressure-responsive particles is preferably 1.0 mass % or less, more preferably as low as possible in order to improve the transparency of the pressure-responsive particles.

The other resins and the additives may be added to the dispersion containing the composite resin particles in the aggregating step so that they are contained in the pressure-responsive particles.

Structure of Pressure-Responsive Particles

The internal structure of the pressure-responsive particles may be a sea-island structure. The sea-island structure may have a sea phase containing a styrene-based resin and island phases dispersed in the sea phase and containing a (meth)acrylic acid ester-based resin. A specific form of the styrene-based resin contained in the sea phase is as described above. A specific form of the (meth)acrylic acid ester-based resin contained in the island phases is as described above. Island phases free of the (meth)acrylic acid ester-based resin may be dispersed in the sea phase.

When the pressure-responsive particles have a sea-island structure, the island phases may have an average size of 200 nm or more and 500 nm or less. When the island phases have an average size of 500 nm or less, the pressure-responsive particles easily undergo pressure-induced phase transition. When the island phases have an average size of 200 nm or more, the pressure-responsive particles have desired mechanical strength (e.g., strength resistant to deformation during stirring in a developing device). From these viewpoints, the island phases preferably have an average size of 220 nm or more and 450 nm or less, more preferably have an average size of 250 nm or more and 400 nm or less.

Examples of the method for controlling the average size of the island phases in the sea-island structure in the above range include increasing or reducing the amount of the (meth)acrylic acid ester-based resin relative to the amount of the styrene-based resin or increasing or reducing the length of time for maintaining a high temperature in the step of fusing and coalescing the aggregated resin particles in the method for producing pressure-responsive particles described below.

The observation of the sea-island structure and the measurement of the average size of the island phases are carried out by the following methods.

The pressure-responsive particles are embedded in epoxy resin and cut with a diamond knife or the like to prepare a section. The prepared section is stained with osmium tetroxide or ruthenium tetroxide in a desiccator. The stained section is observed with a scanning electron microscope (SEM). The sea phase and the island phases of the sea-island structure are distinguished by shades of color resulting from the degree of staining of the resins with osmium tetroxide or ruthenium tetroxide. Whether the sea-island structure is present is confirmed by using this method. From the SEM image, 100 island phases are randomly selected. The major axis of each island phase is measured, and the average value of 100 major axes is defined as the average size.

The pressure-responsive particles may be pressure-responsive particles having a single-layer structure, or may be core-shell pressure-responsive particles having a core and a shell layer coating the core. To prevent fluidization of the pressure-responsive particles under no pressure, the pressure-responsive particles may be core-shell pressure-responsive particles.

When the pressure-responsive particles have a core-shell structure, the core may contain a styrene-based resin and a (meth)acrylic acid ester-based resin in order to facilitate pressure-induced phase transition. The shell layer may contain a styrene-based resin in order to prevent fluidization of the pressure-responsive particles under no pressure. A specific form of the styrene-based resin is as described above. A specific form of the (meth)acrylic acid ester-based resin is as described above.

When the pressure-responsive particles have a core-shell structure, the core may have a sea phase containing a styrene-based resin and island phases dispersed in the sea phase and containing a (meth)acrylic acid ester-based resin. The average size of the island phases may be in the above range. In addition to the core having the above configuration, the shell layer may contain a styrene-based resin. In this case, the sea phase of the core and the shell layer are continuously formed, and the pressure-responsive particles thus easily undergo pressure-induced phase transition. A specific form of the styrene-based resin contained in the sea phase of the core and the shell layer is as described above. A specific form of the (meth)acrylic acid ester-based resin contained in the island phases of the core is as described above.

Examples of the resin contained in the shell layer include polystyrene; and non-vinyl resins, such as epoxy resins, polyester resins, polyurethane resins, polyamide resins, cellulose resins, polyether resins, and modified rosins. These resins may be used alone or in combination of two or more.

The average thickness of the shell layer is preferably 120 nm or more, more preferably 130 nm or more, still more preferably 140 nm or more in order to prevent deformation of the pressure-responsive particles, and preferably 550 nm or less, more preferably 500 nm or less, still more preferably 400 nm or less in order to facilitate the pressure-induced phase transition of the pressure-responsive particles.

The average thickness of the shell layer is measured by the following method.

The pressure-responsive particles are embedded in epoxy resin and cut with a diamond knife or the like to prepare a section. The prepared section is stained with osmium tetroxide or ruthenium tetroxide in a desiccator. The stained section is observed with a scanning electron microscope (SEM). From the SEM image, 10 pressure-responsive particles are randomly selected. The thickness of the shell layer is measured at 20 points per pressure-responsive particle, and the average value is calculated. The average value for 10 pressure-responsive particles is defined as the average thickness.

The volume average particle size (D50v) of the pressure-responsive particles is preferably 4 µm or more, more preferably 5 µm or more, still more preferably 6 µm or more in order to make it easy to handle the pressure-responsive particles, and preferably 30 µm or less, more preferably 20 µm or less, still more preferably 15 µm or less in order to facilitate the pressure-induced phase transition of the entire pressure-responsive particles.

The volume average particle size (D50v) of the pressure-responsive particles is measured by using Coulter Multisizer II (available from Beckman Coulter, Inc.) with an aperture having a diameter of 100 µm. To 2 mL of a 5 mass % aqueous solution of sodium alkylbenzene sulfonate, 0.5 mg or more and 50 mg or less of the pressure-responsive particles are added and dispersed. The resulting dispersion is next mixed with 100 mL or more and 150 mL or less of an electrolyte (ISOTON-II available from Beckman Coulter Inc.). The resulting mixture is subjected to a dispersion treatment with an ultrasonic disperser for 1 minute, and the obtained dispersion is used as a sample. The particle sizes of 50,000 particles having particle sizes of 2 µm or more and 60 µm or less in the sample are measured. The particle size at 50% cumulative volume from the smallest particle size in the volume-based particle size distribution is defined as a volume average particle size (D50v).

External Additives

The pressure-responsive particles may contain external additives as desired.

Examples of external additives include inorganic particles. Examples of the inorganic particles include $SiO_2$, $TiO_2$, $Al_2O_3$, $CuO$, $ZnO$, $SnO_2$, $CeO_2$, $Fe_2O_3$, $MgO$, $BaO$, $CaO$, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

The surfaces of the inorganic particles serving as an external additive may be hydrophobized. Hydrophobization is performed by, for example, immersing the inorganic particles in a hydrophobizing agent. Examples of the hydrophobizing agent include, but are not limited to, a silane coupling agent, a silicone oil, a titanate coupling agent, and an aluminum coupling agent. These hydrophobizing agents may be used alone or in combination of two or more. The amount of the hydrophobizing agent is, for example, 1 part by mass or more and 10 parts by mass or less relative to 100 parts by mass of the inorganic particles.

Examples of external additives also include resin particles (resin particles made of, for example, polystyrene, polymethyl methacrylate, and melamine resin), and cleaning active agents (e.g., higher fatty acid metal salts, such as zinc stearate, fluoropolymer particles).

The amount of external additives externally added is preferably 0.01 mass % or more and 5 mass % or less, more preferably 0.01 mass % or more and 2.0 mass % or less relative to the total mass of the pressure-responsive particles (pressure-responsive base particles) other than the external additives.

Pressure Characteristics of Pressure-Responsive Particles

The pressure-responsive particles produced by the method for producing pressure-responsive particles according to the exemplary embodiment undergo pressure-induced phase transition and satisfy Formula 1 below.

$$10° C. \leq T1-T2 \qquad \text{Formula 1}$$

In Formula 1, T1 is a temperature corresponding to a viscosity of 10,000 Pa·s at a pressure of 1 MPa, and T2 is a temperature corresponding to a viscosity of 10,000 Pa·s at a pressure of 10 MPa.

The temperature difference (T1−T2) is 10° C. or more, preferably 15° C. or more, more preferably 20° C. or more in order to facilitate the pressure-induced phase transition of the pressure-responsive particles, and preferably 120° C. or less, more preferably 100° C. or less, still more preferably 80° C. or less in order to prevent fluidization of the pressure-responsive particles under no pressure.

The temperature T1 is preferably 140° C. or lower, more preferably 130° C. or lower, still more preferably 120° C. or lower, yet still more preferably 115° C. or lower. The lower limit of the temperature T1 is preferably 80° C. or higher, more preferably 85° C. or higher.

The temperature T2 is preferably 40° C. or higher, more preferably 50° C. or higher, still more preferably 60° C. or higher. The upper limit of the temperature T2 is preferably 85° C. or lower.

Examples of the indicator for the susceptibility of the pressure-responsive particles to pressure-induced phase transition include a temperature difference (T1−T3) between the temperature T1 corresponding to a viscosity of 10,000 Pa·s at a pressure of 1 MPa and the temperature T3 corresponding to a viscosity of 10,000 Pa·s at a pressure of 4 MPa. The temperature difference (T1−T3) may be 5° C. or more. To facilitate the pressure-induced phase transition of the pressure-responsive particles, the temperature difference (T1−T3) is preferably 5° C. or more, more preferably 10° C. or more.

The temperature difference (T1−T3) is typically 25° C. or less.

To obtain a temperature difference (T1−T3) of 5° C. or more, the temperature T3 corresponding to a viscosity of 10,000 Pa·s at a pressure of 4 MPa for the pressure-responsive particles is preferably 90° C. or lower, more preferably 85° C. or lower, still more preferably 80° C. or lower. The lower limit of the temperature T3 is preferably 60° C. or higher.

The method for determining the temperature T1, the temperature T2, and the temperature T3 is as described below.

A pellet sample is prepared by compressing the pressure-responsive particles. The pellet sample is set in a flow tester (CFT-500 available from Shimadzu Corporation). The applied pressure is fixed at 1 MPa, and the viscosity against temperature at 1 MPa is measured. From the obtained viscosity graph, the temperature T1 corresponding to a viscosity of $10^4$ Pa·s at an applied pressure of 1 MPa is determined. The temperature T2 is determined in the same manner as that in the method for determining the temperature T1 except that the applied pressure is changed from 1 MPa to 10 MPa. The temperature T3 is determined in the same manner as that in the method for determining the temperature T1 except that the applied pressure is changed from 1 MPa to 4 MPa. The temperature difference (T1−T2) is calculated from the temperature T1 and the temperature T2. The temperature difference (T1−T3) is calculated from the temperature T1 and the temperature T3.

Cartridge

A cartridge according to an exemplary embodiment stores pressure-responsive particles produced by the method for producing pressure-responsive particles according to the exemplary embodiment and is attachable to or detachable from a printed material producing apparatus. When the cartridge is installed in a printed material producing apparatus, the cartridge is connected to a disposing unit of the printed material producing apparatus through a feed tube. The disposing unit disposes pressure-responsive particles on a recording medium.

The pressure-responsive particles are fed to the disposing unit from the cartridge. When the pressure-responsive particles stored in the cartridge runs short, the cartridge is replaced.

Printed Material Producing Apparatus, Method for Producing Printed Material, Printed Material The printed material producing apparatus according to the exemplary embodiment includes: a disposing unit that stores pressure-sensitive particles produced by the method for producing pressure-responsive particles according to the exemplary embodiment and disposes the pressure-responsive particles on a recording medium; and a pressure-bonding unit that folds the recording medium and pressure-bonds the folded recording medium or stacks the recording medium and another recording medium on top of each other and pressure-bonds the stacked recording media to each other.

For example, the disposing unit may include an applying device that applies the pressure-responsive particles to a recording medium and may further include a fixing device that fixes the pressure-responsive particles on the recording medium to the recording medium.

The pressure-bonding unit includes, for example, a folding device that folds the recording medium having the pressure-responsive particles thereon or a stacking device that stacks the recording medium having the pressure-responsive particles thereon and another recording medium on top of each other, and a pressure device that presses the folded recording medium or the stacked recording media.

The pressure device of the pressure-bonding unit applies pressure to the recording medium having the pressure-responsive particles thereon. The pressure-responsive particles are thus fluidized on the recording medium and exhibit adhesiveness.

The printed material producing apparatus according to the exemplary embodiment executes a method for producing a printed material according to an exemplary embodiment. The method for producing a printed material according to the exemplary embodiment includes: a disposing step of disposing, on a recording medium, pressure-responsive particles produced by the method for producing pressure-responsive particles according to the exemplary embodiment; and a pressure-bonding step of folding the recording medium and pressure-bonding the folded recording medium, or stacking the recording medium and another recording medium on top of each other and pressure-bonding the stacked recording media to each other.

For example, the disposing step may include a step of applying the pressure-responsive particles to a recording medium and may further include a step of fixing the pressure-responsive particles on the recording medium to the recording medium.

The pressure-bonding step includes, for example, a folding step of folding the recording medium or a stacking step of stacking the recording medium and another recording medium on top of each other, and a pressing step of pressing the folded recording medium or the stacked recording media.

The pressure-responsive particles may be disposed on the entire surface of the recording medium or may be disposed on part of the recording medium. The pressure-responsive particles are disposed to form one layer or two or more layers on the recording medium. A layer of the pressure-responsive particles may be continuous in the plane direction of the recording medium or may be discontinuous in the plane direction of the recording medium. In a layer of the pressure-responsive particles, the pressure-responsive particles may be arranged in the form of particles, or may be arranged such that adjacent pressure-responsive particles fuse with each other.

The amount of the pressure-responsive particles (may be transparent pressure-responsive particles) on the recording medium in a region where the pressure-responsive particles are disposed is, for example, 0.5 g/m² or more and 50 g/m² or less, 1 g/m² or more and 40 g/m² or less, or 1.5 g/m² or more and 30 g/m² or less. The layer thickness of the pressure-responsive particles (may be transparent pressure-responsive particles) on the recording medium is, for example, 0.2 μm or more and 25 μm or less, 0.4 μm or more and 20 μm or less, or 0.6 μm or more and 15 μm or less.

Examples of the recording medium used in the printed material producing apparatus according to the exemplary embodiment include paper, coated paper having the surface coated with resin or the like, fabrics, nonwoven fabrics, resin films, and resin sheets. The recording medium may have an image on one side or both sides.

An example of the printed material producing apparatus according to the exemplary embodiment will be described below, but this exemplary embodiment is not limited to this example.

FIG. 1 is a schematic structural view of one example of the printed material producing apparatus according to the exemplary embodiment. The printed material producing apparatus shown in FIG. 1 includes a disposing unit 100 and a pressure-bonding unit 200 downstream of the disposing unit 100. The arrows indicate the transport direction of a recording medium.

The disposing unit 100 is a device that disposes, on a recording medium P, pressure-responsive particles produced by the method for producing pressure-responsive particles according to the exemplary embodiment. An image is formed in advance on one side or both sides of the recording medium P.

The disposing unit 100 includes an applying device 110 and a fixing device 120 downstream of the applying device 110.

The applying device 110 applies pressure-responsive particles M to a recording medium P. Examples of the application method used in the applying device 110 include spraying, bar coating, die coating, knife coating, roll coating, reverse roll coating, gravure coating, screen printing, an ink-jet method, lamination, and electrophotography. According to the application method, a liquid composition prepared by dispersing the pressure-responsive particles M in a dispersion medium may be used in the applying device 110.

The recording medium P having the pressure-responsive particles M applied by the applying device 110 is transported to the fixing device 120.

Examples of the fixing device 120 include a heating device that includes a heat source and heats the pressure-responsive particles M on a recording medium P passing through the device to fix the pressure-responsive particles M to the recording medium P; a pressure device that includes a pair of pressure members (roll/roll, belt/roll) and presses a recording medium P passing through the device to fix the pressure-responsive particles M to the recording medium P; and a pressing and heating device that includes a pair of pressure members (roll/roll, belt/roll) having a heat source inside and presses and heats a recording medium P passing through the device to fix the pressure-responsive particles M to the recording medium P.

When the fixing device 120 has a heat source, the surface temperature of the recording medium P heated by the fixing device 120 is preferably 10° C. or higher and 80° C. or lower, more preferably 20° C. or higher and 60° C. or lower, still more preferably 30° C. or higher and 50° C. or lower.

When the fixing device 120 has pressure members, the pressure applied to the recording medium P by the pressure members may be lower than the pressure applied to a recording medium P2 by a pressure device 230.

As the recording medium P passes through the disposing unit 100, the recording medium P becomes a recording medium P1 having the pressure-responsive particles M on an image. The recording medium P1 is transported toward the pressure-bonding unit 200.

In the printed material producing apparatus according to the exemplary embodiment, the disposing unit 100 and the pressure-bonding unit 200 may be adjacent to each other or may be distant from each other. When the disposing unit 100 and the pressure-bonding unit 200 are distant from each other, the disposing unit 100 is connected to the pressure-bonding unit 200 through, for example, a transporting unit (e.g., a belt conveyor) that transports the recording medium P1.

The pressure-bonding unit 200 includes a folding device 220 and the pressure device 230 and folds the recording medium P1 and pressure-bonds the folded recording medium P1.

The folding device 220 folds the recording medium P1 passing through the device to make a folded recording medium P2. The recording medium P2 is, for example, folded in two, three, or four. The recording medium P2 may be partially folded. The pressure-responsive particles M are disposed on at least part of at least one of two opposing surfaces of the recording medium P2.

The folding device 220 may have a pair of pressure members (e.g., roll/roll, belt/roll) that applies pressure to the recording medium P2. The pressure applied to the recording medium P2 by the pressure members of the folding device 220 may be lower than the pressure applied to the recording medium P2 by the pressure device 230.

The pressure-bonding unit 200 may include, instead of the folding device 220, a stacking device that stacks the recording medium P1 and another recording medium on top of each other. The recording medium P1 and another recording medium may be stacked on top of each other in such a manner that, for example, another recording medium is stacked on the recording medium P1 or other recording media are separately stacked on different areas of the recording medium P1. Another recording medium or each of other recording media may be a recording medium having an image formed in advance on one side or both sides, a recording medium having no image formed thereon, or a pressure-bonded printed material produced in advance.

The recording medium P2 discharged from the folding device 220 (or the stacking device) is transported toward the pressure device 230.

The pressure device 230 includes a pair of pressure members (i.e., pressure rolls 231 and 232). The pressure roll 231 and the pressure roll 232 are in contact with each other on their outer circumferential surfaces and press against each other to apply pressure to the recording medium P2 passing therebetween. A pair of pressure members in the pressure device 230 is not limited to a combination of a pressure roll and a pressure roll, and may be a combination of a pressure roll and a pressure belt or a combination of a pressure belt and a pressure belt.

Upon application of pressure to the recording medium P2 passing through the pressure device 230, the pressure-responsive particles M are fluidized on the recording medium P2 under pressure and exhibit adhesiveness.

The pressure device 230 may or may not have, inside the device, a heat source (e.g., a halogen heater) for heating the recording medium P2. The absence of a heat source in the pressure device 230 does not exclude the possibility that heat generation from a motor or the like in the pressure device 230 increases the temperature in the pressure device 230 to an environmental temperature or higher.

When the recording medium P2 passes through the pressure device 230, the opposing surfaces of the folded recording medium P2 are bonded to each other with the fluidized pressure-responsive particles M to produce a pressure-bonded printed material P3. Two opposing surfaces of the pressure-bonded printed material P3 are partially or entirely bonded to each other.

The completed pressure-bonded printed material P3 is discharged from the pressure device 230.

A first form of the pressure-bonded printed material P3 is a pressure-bonded printed material formed by bonding the opposing surfaces of a folded recording medium to each other with the pressure-responsive particles M. The pressure-bonded printed material P3 in this form is produced by a printed material producing apparatus including the folding device 220.

A second form of the pressure-bonded printed material P3 is a pressure-bonded printed material formed by bonding the opposing surfaces of stacked recording media to each other with the pressure-responsive particles M. The pressure-bonded printed material P3 in this form is produced by a pressure-bonded printed material producing apparatus including a stacking device.

The printed material producing apparatus according to the exemplary embodiment is not limited to an apparatus in which the recording media P2 are continuously transported from the folding device 220 (or the stacking device) to the pressure device 230. The printed material producing apparatus according to the exemplary embodiment may be an apparatus in which recording media P2 discharged from the folding device 220 (or the stacking device) are stored and, after the storage of recording media P2 reaches a predetermined amount, the recording media P2 are transported to the pressure device 230.

In the printed material producing apparatus according to the exemplary embodiment, the folding device 220 (or the stacking device) and the pressure device 230 may be adjacent to each other or may be distant from each other. When the folding device 220 (or the stacking device) and the pressure device 230 are distant from each other, the folding device 220 (or the stacking device) is connected to the pressure device 230 through, for example, a transporting unit (e.g., a belt conveyor) that transports the recording medium P2.

The printed material producing apparatus according to the exemplary embodiment may include a cutting unit that cuts a recording medium into a predetermined size. Examples of the cutting unit include a cutting unit that is disposed between the disposing unit 100 and the pressure-bonding unit 200 and cuts away a region that is part of the recording medium P1 and that has no pressure-responsive particles M thereon; a cutting unit that is disposed between the folding device 220 and the pressure device 230 and cuts away a region that is part of the recording medium P2 and that has no pressure-responsive particles M thereon; and a cutting unit that is disposed downstream of the pressure-bonding unit 200 and cuts away a region that is part of the pressure-bonded printed material P3 and that is not bonded with the pressure-responsive particles M.

The printed material producing apparatus according to the exemplary embodiment is not limited to a sheet-fed apparatus. The printed material producing apparatus according to the exemplary embodiment may be an apparatus that forms a long pressure-bonded printed material by subjecting a long recording medium to the disposing step and the pressure-bonding step, and then cuts the long pressure-bonded printed material into a predetermined size.

The printed material producing apparatus according to the exemplary embodiment may further include a color image forming unit that forms a color image on a recording medium by using a color material. Examples of the color image forming unit include a unit that forms a color ink image on a recording medium by an ink-jet system using color ink as a color material, and a unit that forms a color image on a recording medium by an electrophotographic system using a color electrostatic charge image developer.

The producing apparatus having the above structure executes the method for producing a printed material according to the exemplary embodiment further including a color image forming step of forming a color image on a recording medium by using a color material. Examples of the color image forming step include a step of forming a color ink image on a recording medium by an ink-jet system using color ink as a color material, and a step of forming a color image on a recording medium by an electrophotographic system using a color electrostatic charge image developer.

Sheet for Producing Printed Material and Method for Producing Sheet for Producing Printed Material A sheet for producing a printed material according to an exemplary embodiment includes a substrate and pressure-responsive particles disposed on the substrate. The sheet for producing a printed material according to the exemplary embodiment is produced by using pressure-responsive particles produced by the method for producing pressure-responsive particles according to the exemplary embodiment. The pressure-responsive particles on the substrate may or may not keep the same particle shape as before being disposed on the substrate.

The sheet for producing a printed material according to the exemplary embodiment is used as, for example, a masking sheet to be stacked on and bonded to a recording medium in order to conceal information recorded on the recording medium; or as a release sheet used to provide an adhesive layer on a recording medium when recording media are stacked and bonded to each other.

Examples of the substrate used in the sheet for producing a printed material according to the exemplary embodiment include paper, coated paper having the surface coated with resin or the like, fabrics, nonwoven fabrics, resin films, and resin sheets. The substrate may have an image formed on one side or both sides.

In the sheet for producing a printed material according to the exemplary embodiment, the pressure-responsive particles may be disposed on the entire surface of the substrate or may be disposed on part of the substrate. The pressure-responsive particles are disposed to form one layer or two or more layers on the substrate. A layer of the pressure-responsive particles may be continuous in the plane direction of the substrate or may be discontinuous in the plane direction of the substrate. In a layer of the pressure-responsive particles, the pressure-responsive particles may be arranged in the form of particles, or may be arranged such that adjacent pressure-responsive particles fuse with each other.

The amount of the pressure-responsive particles on the substrate in a region where the pressure-responsive particles are disposed is, for example, 0.5 g/m$^2$ or more and 50 g/m$^2$ or less, 1 g/m$^2$ or more and 40 g/m$^2$ or less, or 1.5 g/m$^2$ or more and 30 g/m$^2$ or less. The layer thickness of the pressure-responsive particles on the substrate is, for example, 0.2 μm or more and 25 μm or less, 0.4 μm or more and 20 μm or less, or 0.6 μm or more and 15 μm or less.

The sheet for producing a printed material according to the exemplary embodiment is produced by, for example, a production method including a disposing step of disposing, on the substrate, pressure-responsive particles produced by the method for producing pressure-responsive particles according to the exemplary embodiment.

For example, the disposing step may include an applying step of applying the pressure-responsive particles to the substrate and may further include a fixing step of fixing the pressure-responsive particles on the substrate to the substrate.

The applying step is achieved by an application method, such as spraying, bar coating, die coating, knife coating, roll coating, reverse roll coating, gravure coating, screen printing, an ink-jet method, lamination, or electrophotography. According to the application method in the applying step, a liquid composition prepared by dispersing the pressure-responsive particles in a dispersion medium may be used in the applying step.

Examples of the fixing step include a heating step of heating the pressure-responsive particles on the substrate to fix the pressure-responsive particles to the substrate; a pressing step of pressing the substrate having the pressure-responsive particles applied thereon with a pair of pressure members (roll/roll, belt/roll) to fix the pressure-responsive particles to the substrate; and a pressing and heating step of pressing and heating the substrate having the pressure-responsive particles applied thereon with a pair of pressure members (roll/roll, belt/roll) having a heat source inside to fix the pressure-responsive particles to the substrate.

Production of Printed Material by Electrophotographic System

An exemplary embodiment of application of the pressure-responsive particles produced by the method for producing pressure-responsive particles according to the exemplary embodiment to an electrophotographic system will be described. In the electrophotographic system, the pressure-responsive particles may be used as toner.

Electrostatic Charge Image Developer

An electrostatic charge image developer according to an exemplary embodiment contains at least pressure-responsive particles produced by the method for producing pressure-responsive particles according to the exemplary embodiment. The electrostatic charge image developer according to the exemplary embodiment may be a one-component developer containing only the pressure-responsive particles, or may be a two-component developer containing a mixture of the pressure-responsive particles and a carrier.

The carrier is not limited, and may be a known carrier. Examples of the carrier include a coated carrier obtained by coating, with resin, the surface of a core made of magnetic powder; a magnetic powder-dispersed carrier in which magnetic powder is dispersed and mixed in matrix resin; and a resin-impregnated carrier in which porous magnetic powder is impregnated with resin. The magnetic powder-dispersed carrier or the resin-impregnated carrier may be a carrier having constituent particles as a core and a resin coating the surfaces of the constituent particles.

Examples of the magnetic powder include powders made of magnetic metals, such as iron, nickel, and cobalt; and powders made of magnetic oxides, such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin including an organosiloxane bond, and modified products thereof, fluorocarbon resin, polyester, polycarbonate, phenolic resin, and epoxy resin. The coating resin and the matrix resin may contain other additives, such as conductive particles. Examples of the conductive particles include particles made of metals, such as gold, silver, and copper; and particles made of carbon black, titanium oxide, zinc oxide, tin oxide, barium sulfate, aluminum borate, and potassium titanate.

The surface of the core is coated with resin by, for example, a coating method using a coating layer-forming solution in which a coating resin and various additives (used as desired) are dissolved in an appropriate solvent. The solvent is not limited and may be selected in consideration of the type of resin used, coating suitability, and the like.

Specific examples of the resin coating method include an immersion method that involves immersing the core in the coating layer-forming solution; a spray method that involves spraying the coating layer-forming solution onto the surface of the core; a fluidized bed method that involves spraying the coating layer-forming solution onto the core while floating the core in air flow; and a kneader-coater method that involves mixing the core of the carrier and the coating layer-forming solution in a kneader-coater, and then removing the solvent.

The mixing ratio (mass ratio) of the pressure-responsive particles to the carrier in the two-component developer is preferably from 1:100 to 30:100(=pressure-responsive particles:carrier), more preferably from 3:100 to 20:100.

Printed Material Producing Apparatus, Method for Producing Printed Material

A printed material producing apparatus using an electrophotographic system includes: a disposing unit that stores a developer containing pressure-responsive particles produced by the method for producing pressure-responsive particles according to the exemplary embodiment and disposes the pressure-responsive particles on a recording medium by using the electrophotographic system; and a pressure-bonding unit that folds the recording medium and pressure-bonds the folded recording medium or stacks the recording medium and another recording medium on top of each other and pressure-bonds the stacked recording media to each other.

The printed material producing apparatus according to the exemplary embodiment executes a method for producing a printed material using an electrophotographic system. The method for producing a printed material according to the exemplary embodiment includes: a disposing step of disposing pressure-responsive particles on a recording medium by an electrophotographic system using a developer containing the pressure-responsive particles, the pressure-responsive particles being produced by the method for producing pressure-responsive particles according to the exemplary embodiment; and a pressure-bonding step of folding the recording medium and pressure-bonding the folded recording medium, or stacking the recording medium and another recording medium on top of each other and pressure-bonding the stacked recording media to each other.

The disposing unit in the printed material producing apparatus according to the exemplary embodiment includes: for example, a photoreceptor;

a charging unit that charges the surface of the photoreceptor;

an electrostatic charge image forming unit that forms an electrostatic charge image on the charged surface of the photoreceptor;

a developing unit that stores the electrostatic charge image developer according to the exemplary embodiment and develops the electrostatic charge image on the surface of the photoreceptor by using the electrostatic charge image developer to form a pressure-responsive particle-applied section; and a transfer unit that transfers the pressure-responsive particle-applied section on the surface of the photoreceptor to the surface of a recording medium.

The disposing unit may further include a fixing unit that fixes the pressure-responsive particle-applied section which has been transferred to the surface of the recording medium.

The disposing step in the method for producing a printed material according to the exemplary embodiment includes: for example, a charging step of charging the surface of the photoreceptor;

an electrostatic charge image forming step of forming an electrostatic charge image on the charged surface of the photoreceptor;

a developing step of developing the electrostatic charge image on the surface of the photoreceptor by using the electrostatic charge image developer according to the exemplary embodiment to form a pressure-responsive particle-applied section; and a transferring step of transferring the pressure-responsive particle-applied section on the surface of the photoreceptor to the surface of a recording medium.

The disposing step may further include a fixing step of fixing the pressure-responsive particle-applied section which has been transferred to the surface of the recording medium.

Examples of the disposing unit include devices, such as a direct transfer-type device in which a pressure-responsive particle-applied section formed on the surface of a photoreceptor is directly transferred to a recording medium; an intermediate transfer-type device in which a pressure-responsive particle-applied section formed on the surface of a photoreceptor is first transferred to the surface of an intermediate transfer body, and the pressure-responsive particle-applied section, which has been transferred to the surface of the intermediate transfer body, is second transferred to the surface of a recording medium; a device including a cleaning unit that cleans the surface of a photoreceptor before charging after transfer of the pressure-responsive particle-applied section; and a device including a discharging unit that discharges the surface of a photoreceptor by irradiating the surface of the photoreceptor with discharging light before charging after transfer of a pressure-responsive particle-applied section. When the disposing unit is an intermediate transfer-type device, the transfer unit includes, for example, an intermediate transfer body having the surface to which a pressure-responsive particle-applied section is transferred, a first transfer unit that first transfers the pressure-responsive particle-applied section on the surface of the photoreceptor to the surface of the intermediate transfer body, and a second transfer unit that second transfers the pressure-responsive particle-applied section, which has been transferred to the surface of the intermediate transfer body, to the surface of a recording medium.

In the disposing unit, a section including the developing unit may have a cartridge structure (i.e., process cartridge) that is attachable to and detachable from the disposing unit. The process cartridge may be, for example, a process cartridge that stores the electrostatic charge image developer according to the exemplary embodiment and that includes the developing unit.

The pressure-bonding unit in the printed material producing apparatus according to the exemplary embodiment applies pressure to a recording medium having thereon pressure-responsive particles produced by the method for producing pressure-responsive particles according to the exemplary embodiment. The pressure-responsive particles are thus fluidized on the recording medium and exhibit adhesiveness. The pressure applied to the recording medium by the pressure-bonding unit in order to fluidize the pressure-responsive particles is preferably 3 MPa or more and 300 MPa or less, more preferably 10 MPa or more and 200 MPa or less, still more preferably 30 MPa or more and 150 MPa or less.

The pressure-responsive particles may be disposed on the entire surface of the recording medium or may be disposed on part of the recording medium. The pressure-responsive particles are disposed to form one layer or two or more layers on the recording medium. A layer of the pressure-responsive particles may be continuous in the plane direction of the recording medium or may be discontinuous in the plane direction of the recording medium. In a layer of the pressure-responsive particles, the pressure-responsive particles may be arranged in the form of particles, or may be arranged such that adjacent pressure-responsive particles fuse with each other.

The amount of the pressure-responsive particles (may be transparent pressure-responsive particles) on the recording medium in a region where the pressure-responsive particles are disposed is, for example, 0.5 $g/m^2$ or more and 50 $g/m^2$ or less, 1 $g/m^2$ or more and 40 $g/m^2$ or less, or 1.5 $g/m^2$ or more and 30 $g/m^2$ or less. The layer thickness of the pressure-responsive particles (may be transparent pressure-responsive particles) on the recording medium is, for example, 0.2 μm or more and 25 μm or less, 0.4 μm or more and 20 μm or less, or 0.6 μm or more and 15 μm or less.

Examples of the recording medium used in the printed material producing apparatus according to the exemplary embodiment include paper, coated paper having the surface coated with resin or the like, fabrics, nonwoven fabrics, resin films, and resin sheets. The recording medium may have an image on one side or both sides.

An example of the printed material producing apparatus according to the exemplary embodiment using an electrophotographic system will be described below, but this exemplary embodiment is not limited to this example.

Figure 2:
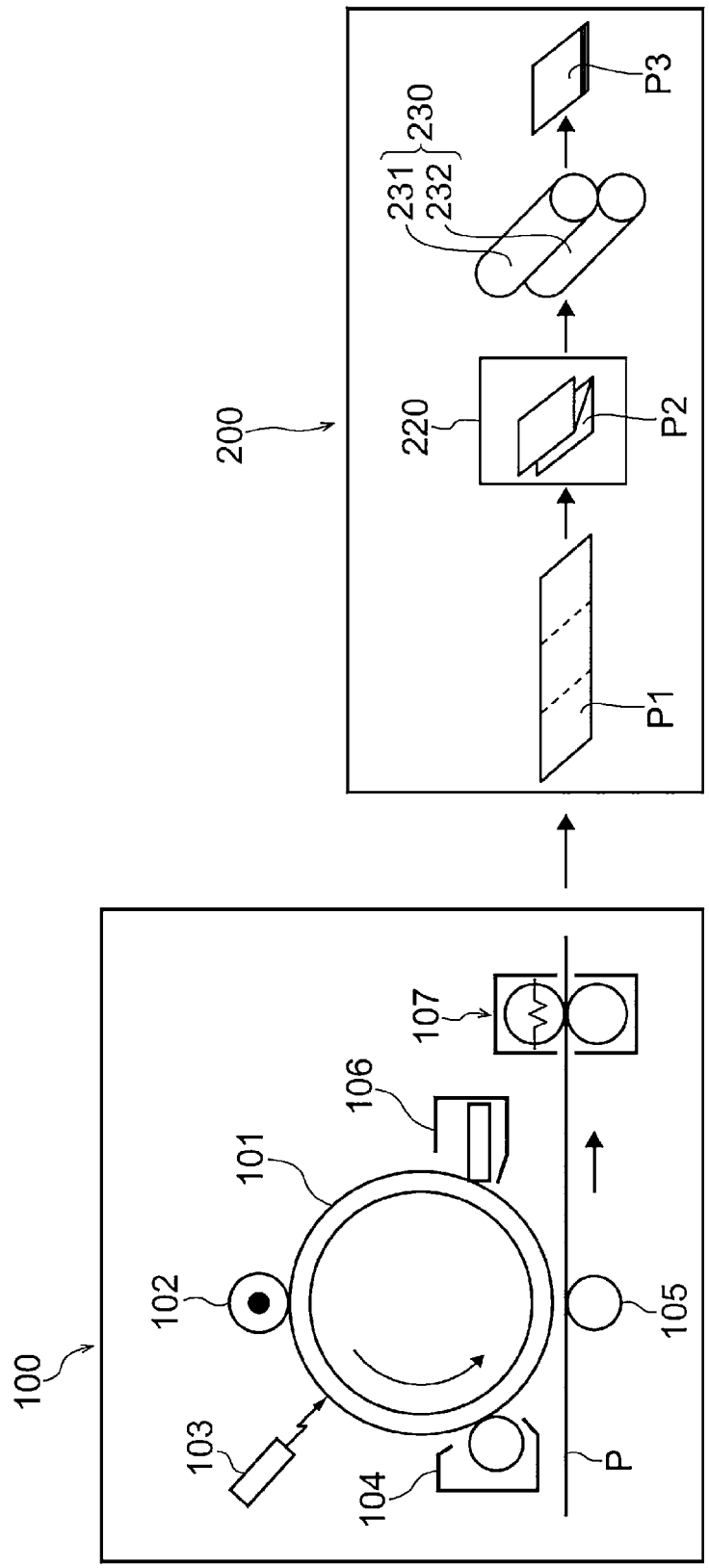
FIG. 2 is a schematic view of another example of the printed material producing apparatus according to an exemplary embodiment.

FIG. 2 is a schematic structural view of one example of the printed material producing apparatus according to the exemplary embodiment. The printed material producing apparatus shown in FIG. 2 includes a disposing unit 100 and a pressure-bonding unit 200 downstream of the disposing unit 100. The arrows indicate the rotation direction of a photoreceptor or the transport direction of a recording medium.

The disposing unit 100 is a direct transfer-type device that disposes, on a recording medium P, pressure-responsive particles produced by the method for producing pressure-responsive particles according to the exemplary embodiment by an electrophotographic system using a developer containing the pressure-responsive particles produced by the method for producing pressure-responsive particles according to the exemplary embodiment. An image is formed in advance on one side or both sides of the recording medium P.

The disposing unit 100 has a photoreceptor 101. The photoreceptor 101 is surrounded by, in sequence, a charging roll (an example of the charging unit) 102, which charges the surface of the photoreceptor 101, an exposure device (an example of the electrostatic charge image forming unit) 103, which exposes the charged surface of the photoreceptor 101 to a laser beam to form an electrostatic charge image, a developing device (an example of the developing unit) 104, which supplies pressure-responsive particles to the electrostatic charge image to develop the electrostatic charge image, a transfer roll (an example of the first transfer unit) 105, which transfers the developed pressure-responsive particle-applied section to a recording medium P, and a photoreceptor cleaning device (an example of the cleaning unit) 106, which removes the pressure-responsive particles remaining on the surface of the photoreceptor 101 after the transfer.

The operation of the disposing unit 100 for disposing, on a recording medium P, pressure-responsive particles produced by the method for producing pressure-responsive particles according to the exemplary embodiment will be described.

First, the charging roll 102 charges the surface of the photoreceptor 101. The charged surface of the photoreceptor 101 is irradiated with a laser beam from the exposure device 103 in accordance with image data sent from a controller (not shown). An electrostatic charge image having a pattern of the pressure-responsive particles is accordingly formed on the surface of the photoreceptor 101.

The electrostatic charge image formed on the photoreceptor 101 rotates to a development position as the photoreceptor 101 runs. At the development position, the electrostatic charge image on the photoreceptor 101 is developed by the developing device 104 to form a pressure-responsive particle-applied section.

The developing device 104 stores a developer containing at least the pressure-responsive particles and a carrier. The pressure-responsive particles are triboelectrically charged by stirring the pressure-responsive particles together with the carrier inside the developing device 104 and held on a developer roll. As the surface of the photoreceptor 101 passes through the developing device 104, the pressure-responsive particles electrostatically adhere to the electrostatic charge image on the surface of the photoreceptor 101, whereby the electrostatic charge image is developed with the pressure-responsive particles. The photoreceptor 101 having the pressure-responsive particle-applied section thereon subsequently runs, and the pressure-responsive particle-applied section on the photoreceptor 101 is transported to a transfer position.

Upon the pressure-responsive particle-applied section on the photoreceptor 101 reaching the transfer position, a transfer bias is applied to the transfer roll 105 so that an electrostatic force from the photoreceptor 101 toward the transfer roll 105 acts on the pressure-responsive particle-applied section, transferring the pressure-responsive particle-applied section on the photoreceptor 101 to the recording medium P.

The pressure-responsive particles remaining on the photoreceptor 101 are removed and collected by the photoreceptor cleaning device 106. The photoreceptor cleaning device 106 is, for example, a cleaning blade or a cleaning brush. The photoreceptor cleaning device 106 may be a cleaning brush in order to prevent a phenomenon in which the pressure-responsive particles remaining on the surface of the photoreceptor are fluidized under pressure and adhere to the surface of the photoreceptor to form a layer.

The recording medium P to which the pressure-responsive particle-applied section has been transferred is transported to a fixing device (an example of the fixing unit) 107. The fixing device 107 is, for example, a pair of fixing members (e.g., roll/roll, belt/roll). The disposing unit 100 may not include the fixing device 107 but may include the fixing device 107 in order to prevent the pressure-responsive particles from falling off the recording medium P. The pressure applied to the recording medium P by the fixing device 107 may be lower than the pressure applied to a recording medium P2 by a pressure device 230. Specifically, the pressure may be 0.2 MPa or more and 1 MPa or less.

The fixing device 107 may or may not have, inside the device, a heat source (e.g., a halogen heater) for heating the recording medium P. When the fixing device 107 has a heat source inside, the surface temperature of the recording medium P heated by the heat source is preferably 150° C. or higher and 220° C. or lower, more preferably 155° C. or higher and 210° C. or lower, still more preferably 160° C. or higher and 200° C. or lower. The absence of a heat source in the fixing device 107 does not exclude the possibility that heat generation from a motor or the like in the disposing unit 100 increases the temperature in the fixing device 107 to an environmental temperature or higher.

As the recording medium P passes through the disposing unit 100, the recording medium P becomes a recording medium P1 having the pressure-responsive particles on an image. The recording medium P1 is transported toward the pressure-bonding unit 200.

In the printed material producing apparatus according to the exemplary embodiment, the disposing unit 100 and the pressure-bonding unit 200 may be adjacent to each other or may be distant from each other. When the disposing unit 100 and the pressure-bonding unit 200 are distant from each other, the disposing unit 100 is connected to the pressure-bonding unit 200 through, for example, a transporting unit (e.g., a belt conveyor) that transports the recording medium P1.

The pressure-bonding unit 200 includes a folding device 220 and the pressure device 230 and folds the recording medium P1 and pressure-bonds the folded recording medium P1.

The folding device 220 folds the recording medium P1 passing through the device to make a folded recording medium P2. The recording medium P2 is, for example, folded in two, three, or four. The recording medium P2 may be partially folded. The pressure-responsive particles are disposed on at least part of at least one of two opposing surfaces of the recording medium P2.

The folding device 220 may have a pair of pressure members (e.g., roll/roll, belt/roll) that applies pressure to the recording medium P2. The pressure applied to the recording medium P2 by the pressure members of the folding device 220 may be lower than the pressure applied to the recording medium P2 by the pressure device 230. Specifically, the pressure may be 1 MPa or more and 10 MPa or less.

The pressure-bonding unit 200 may include, instead of the folding device 220, a stacking device that stacks the recording medium P1 and another recording medium on top of each other. The recording medium P1 and another recording medium may be stacked on top of each other in such a manner that, for example, another recording medium is stacked on the recording medium P1 or other recording media are separately stacked on different areas of the recording medium P1. Another recording medium or each of other recording media may be a recording medium having an image formed in advance on one side or both sides, a recording medium having no image formed thereon, or a pressure-bonded printed material produced in advance.

The recording medium P2 discharged from the folding device 220 (or the stacking device) is transported toward the pressure device 230.

The pressure device 230 includes a pair of pressure members (i.e., pressure rolls 231 and 232). The pressure roll 231 and the pressure roll 232 are in contact with each other on their outer circumferential surfaces and press against each other to apply pressure to the recording medium P2 passing therebetween. A pair of pressure members in the pressure device 230 is not limited to a combination of a pressure roll and a pressure roll, and may be a combination of a pressure roll and a pressure belt or a combination of a pressure belt and a pressure belt.

Upon application of pressure to the recording medium P2 passing through the pressure device 230, the pressure-responsive particles are fluidized on the recording medium P2 under pressure and exhibit adhesiveness. The pressure applied to the recording medium P2 by the pressure device 230 is preferably 3 MPa or more and 300 MPa or less, more preferably 10 MPa or more and 200 MPa or less, still more preferably 30 MPa or more and 150 MPa or less.

The pressure device 230 may or may not have, inside the device, a heat source (e.g., a halogen heater) for heating the recording medium P2. When the pressure device 230 has a heat source inside, the surface temperature of the recording medium P2 heated by the heat source is preferably 30° C. or higher and 120° C. or lower, more preferably 40° C. or higher and 100° C. or lower, still more preferably 50° C. or higher and 90° C. or lower. The absence of a heat source in the pressure device 230 does not exclude the possibility that heat generation from a motor or the like in the pressure device 230 increases the temperature in the pressure device 230 to an environmental temperature or higher.

When the recording medium P2 passes through the pressure device 230, the opposing surfaces of the folded recording medium P2 are bonded to each other with the fluidized pressure-responsive particles to produce a pressure-bonded printed material P3. The opposing surfaces of the pressure-bonded printed material P3 are partially or entirely bonded to each other.

The completed pressure-bonded printed material P3 is discharged from the pressure device 230.

A first form of the pressure-bonded printed material P3 is a pressure-bonded printed material formed by bonding the opposing surfaces of a folded recording medium to each other with the pressure-responsive particles. The pressure-bonded printed material P3 in this form is produced by a printed material producing apparatus including the folding device 220.

A second form of the pressure-bonded printed material P3 is a pressure-bonded printed material formed by bonding the opposing surfaces of stacked recording media to each other with pressure-responsive particles produced by the method for producing pressure-responsive particles according to the exemplary embodiment. The pressure-bonded printed material P3 in this form is produced by a pressure-bonded printed material producing apparatus including a stacking device.

The printed material producing apparatus according to the exemplary embodiment is not limited to an apparatus in which the recording media P2 are continuously transported from the folding device 220 (or the stacking device) to the pressure device 230. The printed material producing apparatus according to the exemplary embodiment may be an apparatus in which recording media P2 discharged from the folding device 220 (or the stacking device) are stored and, after the storage of recording media P2 reaches a predetermined amount, the recording media P2 are transported to the pressure device 230.

In the printed material producing apparatus according to the exemplary embodiment, the folding device 220 (or the stacking device) and the pressure device 230 may be adjacent to each other or may be distant from each other. When the folding device 220 (or the stacking device) and the pressure device 230 are distant from each other, the folding device 20 (or the stacking device) is connected to the pressure device 230 through, for example, a transporting unit (e.g., a belt conveyor) that transports the recording medium P2.

The printed material producing apparatus according to the exemplary embodiment may include a cutting unit that cuts a recording medium into a predetermined size. Examples of the cutting unit include a cutting unit that is disposed between the disposing unit 100 and the pressure-bonding unit 200 and cuts away a region that is part of the recording medium P1 and that does not have thereon pressure-responsive particles produced by the method for producing pressure-responsive particles according to the exemplary embodiment; a cutting unit that is disposed between the folding device 220 and the pressure device 230 and cuts away a region that is part of the recording medium P2 and that does not have the pressure-responsive particles thereon; and a cutting unit that is disposed downstream of the pressure-bonding unit 200 and cuts away a region that is part of the pressure-bonded printed material P3 and that is not bonded with the pressure-responsive particles according to the exemplary embodiment.

The printed material producing apparatus according to the exemplary embodiment is not limited to a sheet-fed apparatus. The printed material producing apparatus according to the exemplary embodiment may be an apparatus that forms a long pressure-bonded printed material by subjecting a long recording medium to the disposing step and the pressure-bonding step, and then cuts the long pressure-bonded printed material into a predetermined size.

The printed material producing apparatus according to the exemplary embodiment may further include a color image forming unit that forms a color image on a recording medium by an electrophotographic system using a color electrostatic charge image developer. The color image forming unit includes: for example, a photoreceptor;

a charging unit that charges the surface of the photoreceptor;

an electrostatic charge image forming unit that forms an electrostatic charge image on the charged surface of the photoreceptor;

a developing unit that stores a color electrostatic charge image developer and develops the electrostatic charge image on the surface of the photoreceptor by using the color electrostatic charge image developer to form a color toner image;

a transfer unit that transfers the color toner image on the surface of the photoreceptor to the surface of a recording medium; and a thermal fixing unit that thermally fixes the color toner image which has been transferred to the surface of the recording medium.

The producing apparatus having the above structure executes the method for producing a printed material according to the exemplary embodiment further including a color image forming step of forming a color image on a recording medium by an electrophotographic system using a color electrostatic charge image developer. Specifically, the color image forming step includes:

a charging step of charging the surface of the photoreceptor;

an electrostatic charge image forming step of forming an electrostatic charge image on the charged surface of the photoreceptor;

a developing step of developing the electrostatic charge image on the surface of the photoreceptor by using a color electrostatic charge image developer to form a color toner image;

a transferring step of transferring the color toner image on the surface of the photoreceptor to the surface of a recording medium; and a thermal fixing step of thermally fixing the color toner image which has been transferred to the surface of the recording medium.

Examples of the color image forming unit in the printed material producing apparatus according to the exemplary embodiment include devices, such as a direct transfer-type device in which a color toner image formed on the surface of a photoreceptor is directly transferred to a recording medium; an intermediate transfer-type device in which a color toner image formed on the surface of a photoreceptor is first transferred to the surface of an intermediate transfer body, and the color toner image, which has been transferred to the surface of the intermediate transfer body, is second transferred to the surface of a recording medium; a device including a cleaning unit that cleans the surface of a photoreceptor before charging after transfer of a color toner image; and a device including a discharging unit that discharges the surface of a photoreceptor by irradiating the surface of the photoreceptor with discharging light before charging after transfer of a color toner image. When the color image forming unit is an intermediate transfer-type device, the transfer unit includes, for example, an intermediate transfer body having the surface to which a color toner image is transferred, a first transfer unit that first transfers the color toner image on the surface of the photoreceptor to the surface of the intermediate transfer body, and a second transfer unit that second transfers the color toner image, which has been transferred to the surface of the intermediate transfer body, to the surface of a recording medium.

When the color image forming unit and the disposing unit for a developer containing pressure-responsive particles produced by the method for producing pressure-responsive particles according to the exemplary embodiment are intermediate transfer-type devices in the printed material producing apparatus according to the exemplary embodiment, the disposing unit and the color image forming unit may share the intermediate transfer body and the second transfer unit.

In the printed material producing apparatus according to the exemplary embodiment, the color image forming unit and the disposing unit for a developer containing the pressure-responsive particles produced by the method for producing pressure-responsive particles according to the exemplary embodiment may share the thermal fixing unit.

An example of the printed material producing apparatus according to the exemplary embodiment including the color image forming unit will be described below, but the exemplary embodiment is not limited to this example. The main parts shown in the figure will be described below, and other parts will not be described.

Figure 3:
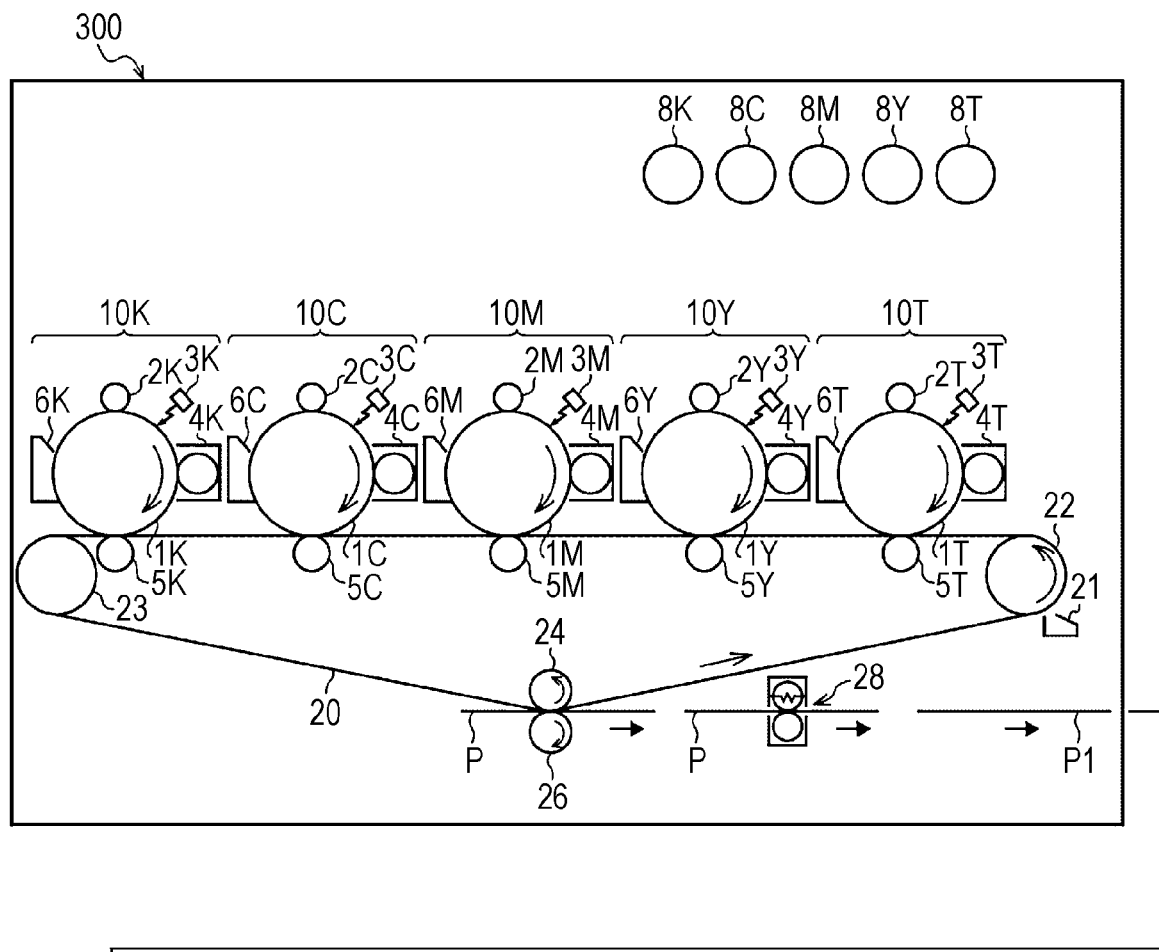
FIG. 3 is a schematic view of the other example of the printed material producing apparatus according to an exemplary embodiment.
Figure 3:
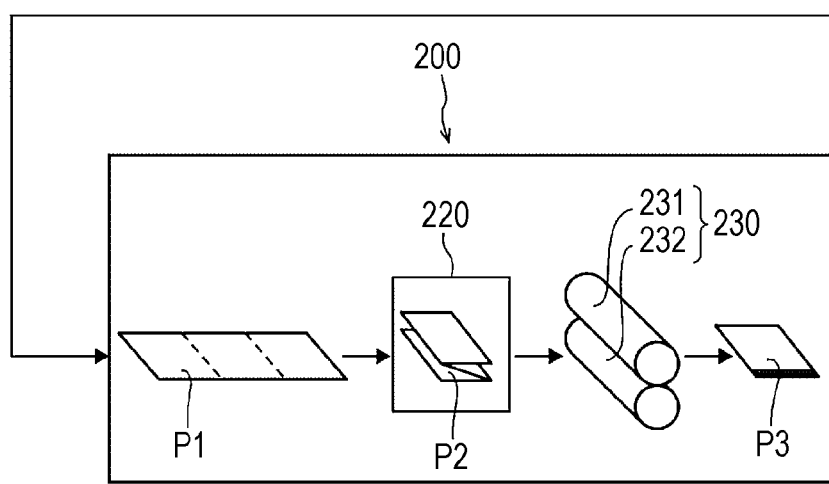

FIG. 3 is a schematic structural view of one example of the printed material producing apparatus according to the exemplary embodiment using an electrophotographic system. The printed material producing apparatus shown in FIG. 3 includes a printing unit 300 and a pressure-bonding unit 200 downstream of the printing unit 300. The printing unit 300 disposes, on a recording medium, pressure-responsive particles produced by the method for producing pressure-responsive particles according to the exemplary embodiment and forms color images in one process.

The printing unit 300 is of intermediate transfer type using a five color tandem system. The printing unit 300 includes a unit 10T and units 10Y, 10M, 10C, and 10K. The unit 10T disposes the pressure-responsive particles (T). The units 10Y, 10M, 10C, and 10K respectively form color images of yellow (Y), magenta (M), cyan (C), and black (K). The unit 10T is a disposing unit that disposes the pressure-responsive particles on a recording medium P by using a developer containing the pressure-responsive particles. The units 10Y, 10M, 10C, and 10K each form a color image on the recording medium P by using a developer containing a color toner. The units 10T, 10Y, 10M, 10C, and 10K each use an electrophotographic system.

The units 10T, 10Y, 10M, 10C, and 10K are arranged and spaced apart from each other in the horizontal direction. The units 10T, 10Y, 10M, 10C, and 10K may be process cartridges that are attachable to and detachable from the printing unit 300.

An intermediate transfer belt (an example of the intermediate transfer body) 20 extends so as to pass through lower parts of the units 10T, 10Y, 10M, 10C, and 10K. The intermediate transfer belt 20 is wound around a drive roll 22, a support roll 23, and an opposing roll 24, which are in contact with the inner surface of the intermediate transfer belt 20. The intermediate transfer belt 20 runs in the direction from the unit 10T toward the unit 10K. An intermediate transfer body cleaning device 21 is disposed adjacent to the image holding surface of the intermediate transfer belt 20 so as to face the drive roll 22.

The units 10T, 10Y, 10M, 10C, and 10K respectively include developing devices (examples of the developing units) 4T, 4Y, 4M, 4C, and 4K. The pressure-responsive particles stored in a pressure-responsive particle cartridge 8T and yellow toner, magenta toner, cyan toner, and black toner respectively stored in toner cartridges 8Y, 8M, 8C, and 8K are respectively supplied to the developing devices 4T, 4Y, 4M, 4C, and 4K.

Since the units 10T, 10Y, 10M, 10C, and 10K have the same structure and the same operation, the unit 10T which disposes the pressure-responsive particles on a recording medium will be described as a representative example.

The unit 10T has a photoreceptor 1T. The photoreceptor 1T is surrounded by, in sequence, a charging roll (an example of the charging unit) 2T, which charges the surface of the photoreceptor 1T, an exposure device (an example of the electrostatic charge image forming unit) 3T, which exposes the charged surface of the photoreceptor 1T to a laser beam to form an electrostatic charge image, a developing device (an example of the developing unit) 4T, which supplies pressure-responsive particles to the electrostatic charge image to develop the electrostatic charge image, a first transfer roll (an example of the first transfer unit) 5T, which transfers the developed pressure-responsive particle-applied section to an intermediate transfer belt 20, and a photoreceptor cleaning device (an example of the cleaning unit) 6T, which removes the pressure-responsive particles remaining on the surface of the photoreceptor 1T after the first transfer. The first transfer roll 5T is disposed on the inner side of the intermediate transfer belt 20 so as to face the photoreceptor 1T.

The operation for disposing, on the recording medium P, pressure-responsive particles produced by the method for producing pressure-responsive particles according to the exemplary embodiment and the operation for forming color images will be described below by illustrating the operation of the unit 10T.

First, the charging roll 2T charges the surface of the photoreceptor 1T. The charged surface of the photoreceptor 1T is irradiated with a laser beam from the exposure device 3T in accordance with image data sent from a controller (not shown). An electrostatic charge image having a pattern of the pressure-responsive particles is accordingly formed on the surface of the photoreceptor 1T.

The electrostatic charge image formed on the photoreceptor 1T rotates to a development position as the photoreceptor 1T runs. At the development position, the electrostatic charge image on the photoreceptor 1T is developed by the developing device 4T to form a pressure-responsive particle-applied section.

The developing device 4T stores a developer containing at least the pressure-responsive particles and a carrier. The pressure-responsive particles are triboelectrically charged by stirring the pressure-responsive particles together with the carrier inside the developing device 4T and held on a developer roll. As the surface of the photoreceptor 1T passes through the developing device 4T, the pressure-responsive particles electrostatically adhere to the electrostatic charge image on the surface of the photoreceptor 1T, whereby the electrostatic charge image is developed with the pressure-responsive particles. The photoreceptor 1T having the pressure-responsive particle-applied section thereon subsequently runs, and the pressure-responsive particle-applied section on the photoreceptor 1T is transported to a first transfer position.

Upon the pressure-responsive particle-applied section on the photoreceptor 1T reaching the first transfer position, a first transfer bias is applied to the first transfer roll 5T so that an electrostatic force from the photoreceptor 1T toward the first transfer roll 5T acts on the pressure-responsive particle-applied section, transferring the pressure-responsive particle-applied section on the photoreceptor 1T to the intermediate transfer belt 20. The pressure-responsive particles remaining on the photoreceptor 1T are removed and collected by the photoreceptor cleaning device 6T. The photoreceptor cleaning device 6T is, for example, a cleaning blade or a cleaning brush, preferably a cleaning brush.

The units 10Y, 10M, 10C, and 10K also operate in the same manner as the unit 10T by using developers containing color toner. Accordingly, the intermediate transfer belt 20 to which the pressure-responsive particle-applied section has been transferred in the unit 10T passes through the units 10Y, 10M, 10C, and 10K in this order, and the toner images of respective colors are transferred to the intermediate transfer belt 20 in a superimposed manner.

The intermediate transfer belt 20 to which the pressure-responsive particle-applied section and the toner images have been transferred through the units 10T, 10Y, 10M, 10C, and 10K in a superimposed manner reaches a second transfer section. The second transfer section includes the intermediate transfer belt 20, the opposing roll 24 in contact with the inner surface of the intermediate transfer belt, and a second transfer roll (an example of the second transfer unit) 26 disposed adjacent to the image holding surface of the intermediate transfer belt 20. The recording medium P is fed to a nip between the second transfer roll 26 and the intermediate transfer belt 20 by way of a feeding mechanism, and a second transfer bias is applied to the opposing roll 24. At this time, an electrostatic force from the intermediate transfer belt 20 toward the recording medium P acts on the pressure-responsive particle-applied section and the toner images, transferring the pressure-responsive particle-applied section and the toner images on the intermediate transfer belt 20 to the recording medium P.

The recording medium P to which the pressure-responsive particle-applied section and the toner images have been transferred is transported to a thermal fixing device (an example of the thermal fixing unit) 28. The thermal fixing device 28 includes a heat source, such as a halogen heater, and heats the recording medium P. The surface temperature of the recording medium P heated by the thermal fixing device 28 is preferably 150° C. or higher and 220° C. or lower, more preferably 155° C. or higher and 210° C. or lower, still more preferably 160° C. or higher and 200° C. or lower. As the recording medium P passes through the thermal fixing device 28, the color toner images are thermally fixed to the recording medium P.

The thermal fixing device 28 may be a device that applies pressure under heating in order to prevent the pressure-responsive particles from falling off the recording medium P and improve the fixability of the color image to the recording medium P. The thermal fixing device 28 may be, for example, a pair of fixing members (roll/roll, belt/roll) having a heat source inside. When the thermal fixing device 28 applies pressure, the pressure applied to the recording medium P by the thermal fixing device 28 may be lower than the pressure applied to a recording medium P2 by a pressure device 230. Specifically, the pressure may be 0.2 MPa or more and 1 MPa or less.

As the recording medium P passes through the printing unit 300, the recording medium P becomes a recording medium P1 having the color image and the pressure-responsive particles thereon. The recording medium P1 is transported toward the pressure-bonding unit 200.

The pressure-bonding unit 200 in FIG. 3 may have the same structure as the pressure-bonding unit 200 in FIG. 2, and the structure and operation of the pressure-bonding unit 200 in FIG. 3 are not described in detail.

In the printed material producing apparatus according to the exemplary embodiment, the printing unit 300 and the pressure-bonding unit 200 may be adjacent to each other or may be distant from each other. When the printing unit 300 and the pressure-bonding unit 200 are distant from each other, the printing unit 300 is connected to the pressure-bonding unit 200 through, for example, a transporting unit (e.g., a belt conveyor) that transports the recording medium P1.

The printed material producing apparatus according to the exemplary embodiment may include a cutting unit that cuts a recording medium into a predetermined size. Examples of the cutting unit include a cutting unit that is disposed between the printing unit 300 and the pressure-bonding unit 200 and cuts away a region that is part of the recording medium P1 and that does not have the pressure-responsive particles thereon; a cutting unit that is disposed between the folding device 220 and the pressure device 230 and cuts away a region that is part of the recording medium P2 and that does not have the pressure-responsive particles thereon; and a cutting unit that is disposed downstream of the pressure-bonding unit 200 and cuts away a region that is part of the pressure-bonded printed material P3 and that is not bonded with the pressure-responsive particles.

The printed material producing apparatus according to the exemplary embodiment is not limited to a sheet-fed apparatus. The printed material producing apparatus according to the exemplary embodiment may be an apparatus that forms a long pressure-bonded printed material by subjecting a long recording medium to the color image forming step, the disposing step, and the pressure-bonding step, and then cuts the long pressure-bonded printed material into a predetermined size.

Process Cartridge

A process cartridge to be installed in a printed material producing apparatus using an electrophotographic system will be described.

A process cartridge according to an exemplary embodiment includes a developing unit that stores the electrostatic charge image developer according to the exemplary embodiment and that develops an electrostatic charge image on the surface of a photoreceptor by using the electrostatic charge image developer to form a pressure-responsive particle-applied section. The process cartridge is attachable to and detachable from a printed material producing apparatus.

The process cartridge according to the exemplary embodiment may include a developing unit, and as necessary, at least one selected from a photoreceptor, a charging unit, an electrostatic charge image forming unit, a transfer unit, and the like.

Exemplary embodiments of the process cartridge include a cartridge including a photoreceptor and, on the periphery of the photoreceptor, a charging roll (an example of the charging unit), a developing device (an example of the developing unit), and a photoreceptor cleaning device (an example of the cleaning unit), which are integrated by a housing. The housing has an opening for exposure. The housing has an installation rail, and the process cartridge is attached to the printed material producing apparatus through the installation rail.

EXAMPLES

Exemplary embodiments of the present disclosure will be described below in detail by way of Examples, but exemplary embodiments of the present disclosure are not limited to these Examples. In the following description, the units "part" and "%" are on a mass basis, unless otherwise specified.

Example 1

Preparation of Styrene-Based Resin Particle Dispersion St1
 Styrene (St): 370 parts
 n-Butyl acrylate (BA): 115 parts
 Acrylic acid (AA): 15 parts
 Dodecanethiol: 7.5 parts The above materials are mixed and dissolved to prepare a monomer solution.

An anionic surfactant (DOWFAX 2A1 available from The Dow Chemical Company) (8 parts) is dissolved in 205 parts of ion exchange water, and the monomer solution is added to the resulting solution and dispersed to form an emulsion.

The anionic surfactant (2.2 parts) is dissolved in 462 parts of ion exchange water, and the resulting solution is placed in a flask for polymerization equipped with a stirrer, a thermometer, a reflux condenser, and a nitrogen gas inlet tube. The solution is heated to 73° C. under stirring and held at this temperature.

Ammonium persulfate (3 parts) is dissolved in 21 parts of ion exchange water, and the resulting solution is added dropwise to the flask for polymerization through a metering pump over 15 minutes, and the emulsion is then added dropwise over 160 minutes through a metering pump.

Next, the flask for polymerization is held at 75° C. for three hours under gentle stirring, and then returned to room temperature (25° C., the same applies hereinafter).

This process produces a styrene-based resin particle dispersion St1 having a volume average particle size (D50v) of 220 nm, a weight average molecular weight of 33,000 as determined by GPC (UV detection), a glass transition temperature of 53° C., and a solid content of 42%.

Preparation of Composite Resin Particle Dispersion SM1
 Styrene-based resin particle dispersion St1: 400 parts (solid content)
 2-Ethylhexyl acrylate (2EHA): 250 parts
 n-Butyl acrylate (BA): 150 parts
 Ion exchange water: 982 parts The above materials are placed in a flask for polymerization, stirred at 25° C. for one hour, and then heated to 70° C. Ammonium persulfate (2.5 parts) is dissolved in 75 parts of ion exchange water, and the resulting solution is added dropwise to the flask for polymerization through a metering pump over 60 minutes. Next, the flask for polymerization is held at 70° C. for three hours under gentle stirring, and then returned to room temperature.

This process produces a composite resin particle dispersion SM1 that has a solid content of 32% and in which the composite resin particles have a volume average particle size (D50v) of 219 nm, and the resin of the composite resin particles has a weight average molecular weight of 220,000 as determined by GPC (UV detection).

Preparation of Pressure-Responsive Particles
 Composite resin particle dispersion SM1: 180 parts (solid content)
 Anionic surfactant: 1 part These components are placed in a reactor and mixed. While the mixture is dispersed with a homogenizer (5,000 rpm), 1.2 parts of 17% aluminum sulfate is added and dispersed for 6 minutes. The resulting dispersion is then heated to grow aggregation and cooled to 49° C. from the time point at which the particle size reaches 10 μm (liquid temperature: 57° C.). Subsequently, 40 parts (solid content)

of the styrene-based resin particle dispersion St1 and 1.3 parts of polyaluminum chloride are added, and the dispersion mixture is heated to 55° C. and maintained at 55° C. for 30 minutes. The dispersion is then heated to 90° C. to cause coalescence, followed by filtration, washing, and drying. This process produces pressure-responsive particles (EA1) having a volume average particle size of 10.5 μm and an average circularity of 0.967.

Examples 2 to 5

Preparation of Composite Resin Particle Dispersions SM2 to SM5

Composite resin particle dispersions SM2 to SM5 are prepared in the same manner as in the preparation of the composite resin particle dispersion SM1 except that the acrylic acid monomers are changed to the compositions shown in Table 1.

Pressure-responsive particles (EA2 to EA5) are prepared in the same manner as that in Example 1 except that the composite resin particle dispersions SM2 to SM5 are used instead of the composite resin particle dispersion SM1.

Examples 6 to 9

Preparation of Styrene-Based Resin Particle Dispersions St2 to St5

Styrene-based resin particle dispersions St2 to St5 are prepared in the same manner as that for the styrene-based resin particle dispersion St1 except that the styrenic monomers are changed to the compositions shown in Table 1.
Preparation of Composite Resin Particle Dispersions SM6 to SM9

Composite resin particle dispersions SM6 to SM9 are prepared in the same manner as that for the composite resin particle dispersion SM1 except that the styrene-based resin particle dispersions St2 to St5 are used instead of the styrene-based resin particle dispersion St1.

Pressure-responsive particles (EA6 to EA9) are produced in the same manner as that in Example 1 except that the composite resin particle dispersions SM6 to SM9 are used instead of the composite resin particle dispersion SM1.

Examples 10 and 11

Preparation of Composite Resin Particle Dispersions SM10 and SM11

Composite resin particle dispersions SM10 to SM11 are prepared in the same manner as that for the composite resin particle dispersion SM1 except that the amounts of acrylic monomers are changed such that the mass ratio of the (meth)acrylic acid ester-based resin (Ac) to the styrene-based resin (St) is as shown in Table 1.

Pressure-responsive particles (EA10 and EA11) are produced in the same manner as that in Example 1 except that the composite resin particle dispersions SM10 and SM11 are used instead of the composite resin particle dispersion SM1.

Example 12

Pressure-responsive particles (EA12) are produced in the same manner as that in Example 1 except that, in the shell forming step, the amount of the styrene-based resin particle dispersion St1 is changed to 11.5 parts (solid content), and the amount of polyaluminum chloride added is also changed to the amount of aggregating agent added as described in Table 1.

Example 13

Pressure-responsive particles (EA13) are produced in the same manner as that in Example 1 except that, in the shell forming step, the amount of the styrene-based resin particle dispersion St1 is changed to 110 parts (solid content), and the amount of polyaluminum chloride added is also changed to the amount of aggregating agent added as described in Table 1.

Example 14

Pressure-responsive particles (EA14) are produced in the same manner as that in Example 1 except that, in the shell forming step, 0.77 parts of aluminum sulfate is added instead of polyaluminum chloride.

Example 15

Pressure-responsive particles (EA15) are produced in the same manner as that in Example 1 except that, in the shell forming step, the styrene-based resin particle dispersion is added without cooling the liquid.

Example 16

Pressure-responsive particles (EA16) are produced in the same manner as that in Example 1 except that, in preparing the pressure-responsive particles, 13.2 parts (solid content) of a silica dispersion (solid content: 21 mass %, particle size 12 nm) is added together with the composite resin particle dispersion SM1 and an anionic surfactant.

Example 17

Pressure-responsive particles (EA17) are produced in the same manner as that in Example 2 except that, in preparing the pressure-responsive resin particles, 4.4 parts (solid content) of a silica dispersion (solid content: 21 mass %, particle size 7 nm) is added together with the composite resin particle dispersion SM1 and an anionic surfactant.

Example 18

Pressure-responsive particles (EA18) are produced in the same manner as that in Example 3 except that, in preparing the pressure-responsive resin particles, 17.6 parts (solid content) of a silica dispersion (solid content: 21 mass %, particle size 40 nm) is added together with the composite resin particle dispersion SM1 and an anionic surfactant.

Comparative Example 1

Pressure-responsive resin particles (EA19) are produced in the same manner as that in Example 1 except that the amount of polyaluminum chloride added is changed from 1.3 parts to 0.04 parts.

Comparative Example 2

Pressure-responsive resin particles (EA20) are produced in the same manner as that in Example 1 except that the amount of polyaluminum chloride added is changed to the value described in Table 1.

Comparative Examples 3 and 4

Pressure-responsive resin particles (EA21 and EA22) are produced in the same manner as in Example 1 except that the ratio between the amount of the styrene-based resin particle dispersion St1 used and the amount of 2-ethylhexyl acrylate and n-butyl acrylate monomers used to prepare the composite resin particle dispersion SM1 is changed to the values described in Table 1.

Evaluation of Tackiness

To a sheet of paper on which a text image has been printed with an electrophotographic printer, the pressure-responsive particles are uniformly applied with a cake printer at two standards of 2.0 g/m² and 1.5 g/m² at a voltage of 100 V by sprinkling the pressure-responsive resin particles on a mesh with a mesh size of 50 μm. The pressure-responsive particles are fixed to the sheet of paper by using a fixing bench of a multifunction printer. The sheet of paper is folded in two so that the image is on the inside, and then pressed (Gap 10) through a sealer (Pressle multi2 available from Toppan Forms Co., Ltd.). The pressed sheet of paper is left to stand overnight and then cut into a width of 15 mm, which is then subjected to a 90-degree peel test to measure the peel force (unit: N/15 mm) and evaluate tackiness.

The evaluation criteria are described below.

S: ≥0.8 N/15 mm for 1.5 g/m² sample
A: ≥0.8 N/15 mm for 2.0 g/m² sample
B: more than 0.4 N/15 mm and less than 0.8 N/15 mm for 2.0 g/m² sample
C: ≤0.4 N/15 mm for 2.0 g/m² sample Grade S, A, or B is preferred, Grade S or A is more preferred, and Grade S is still more preferred.

Evaluation of Dispersion Storage Stability

In preparing the pressure-responsive particles, the pressure-responsive particle dispersion after heating to 90° C. to cause coalescence but before filtration is cooled to 30° C. and then stored in a sealed chamber at 30° C. for one month. The particle size distribution is then measured by Coulter LS. If aggregated particles are formed, the measured volume average particle size distribution has two peaks with one peak on the coarse particle side. The evaluation criteria are described below.

A: The volume average particle size distribution has one peak, which is the same particle size distribution as the initial one.

B: The volume average particle size distribution has two peaks with one peak on the coarse particle side and returns to one peak after re-stirring.

C: The volume average particle size distribution has two peaks with one peak on the coarse particle side and does not return to one peak even after re-stirring.

Grade A or B is preferred, and Grade A is more preferred.

Adhesion of Aggregates and Fusion-Bonded Materials

The adhesion of aggregates and fused materials is evaluated on the basis of the following evaluation criteria according to the application conditions and mesh conditions after the pressure-responsive particles are applied to 200 sheets of paper with the cake printer in the tackiness evaluation.

A: The pressure-responsive particles can be continuously applied without any problem.

B: There is some clogging of the mesh, but the pressure-responsive particles can be applied after the mesh is blown during application.

C: The mesh is clogged with the pressure-responsive particles, and the pressure-responsive particles cannot be applied even after the mesh is blown.

The evaluation results are summarized in Table 1.

TABLE 1

| | | Styrene-Based Resin | | (Meth)Acrylic Acid Ester-Based Resin | | Amount of Silica Added Relative to Total Mass of Composite Resin Particles (mass %) | Shell Forming Step Amount of Styrene-Based Resin Particles Added Relative to Total Mass of Composite Resin Particles (mass %) |
|---|---|---|---|---|---|---|---|
| | Resin Particle Dispersion | Mass Ratio of Polymer Components | Tg (° C.) | Mass Ratio of Polymer Components | Tg (° C.) | | |
| Example 1 | St1 | St/BA/AA = 74/23/3 | 53 | 2EHA/BA = 62/38 | −50 | — | 18 |
| Example 2 | St1 | St/BA/AA = 74/23/3 | 53 | 2EHA/PA = 38/62 | −46 | — | 18 |
| Example 3 | St1 | St/BA/AA = 74/23/3 | 53 | 2EHA/HA = 38/62 | −52 | — | 18 |
| Example 4 | St1 | St/BA/AA = 74/23/3 | 53 | 2EHA/BA = 25/75 | −55 | — | 18 |
| Example 5 | St1 | St/BA/AA = 74/23/3 | 53 | 2EHA/BA = 75/25 | −50 | — | 18 |
| Example 6 | St2 | St/2EHA/AA = 74/23/3 | 55 | 2EHA/BA = 62/38 | −50 | — | 18 |
| Example 1 | St3 | St/EA/AA = 64/33/3 | 55 | 2EHA/BA = 62/38 | −50 | — | 18 |
| Example 8 | St4 | St/BA/AA = 85/10/5 | 56 | 2EHA/BA = 62/38 | −50 | — | 18 |
| Example 9 | St5 | St/BA/AA = 74/23/3 | 53 | 2EHA/BA = 62/38 | −50 | — | 18 |
| Example 10 | St1 | St/BA/AA = 74/23/3 | 53 | 2EHA/BA = 62/38 | −50 | — | 18 |
| Example 11 | St1 | St/BA/AA = 74/23/3 | 53 | 2EHA/BA = 62/38 | −50 | — | 18 |
| Example 12 | St1 | St/BA/AA = 74/23/3 | 53 | 2EHA/BA = 62/38 | −50 | — | 6 |
| Example 13 | St1 | St/BA/AA = 74/23/3 | 53 | 2EHA/BA = 62/38 | −50 | — | 38 |
| Example 14 | St1 | St/BA/AA = 74/23/3 | 53 | 2EHA/BA = 62/38 | −50 | — | 18 |

TABLE 1-continued

| | | | | | | | |
|---|---|---|---|---|---|---|---|
| Example 15 | St1 | St/BA/AA = 74/23/3 | 53 | 2EHA/BA = 62/38 | −50 | — | 18 |
| Example 16 | St1 | St/BA/AA = 74/23/3 | 53 | 2EHA/BA = 62/38 | −50 | 6% (12 nm silica) | 18 |
| Example 17 | St1 | St/BA/AA = 74/23/3 | 53 | 2EHA/PA = 38/62 | −46 | 2% (7 nm silica) | 18 |
| Example 18 | St1 | St/BA/AA = 74/23/3 | 53 | 2EHA/HA = 38/62 | −52 | 8% (40 nm silica) | 18 |
| Comparative Example 1 | St1 | St/BA/AA = 74/23/3 | 53 | 2EHA/BA = 62/38 | −50 | — | 18 |
| Comparative Example 2 | St1 | St/BA/AA = 74/23/3 | 53 | 2EHA/BA = 62/38 | −50 | — | 18 |
| Comparative Example 3 | St1 | St/BA/AA = 74/23/3 | 53 | 2EHA/BA = 62/38 | −50 | — | 18 |
| Comparative Example 4 | St1 | St/BA/AA = 74/23/3 | 53 | 2EHA/BA = 62/38 | −50 | — | 18 |

| | Shell Forming Step | | Pressure-Responsive Particles Mass Ratio of (Meth)Acrylic Acid Ester-Based Resin (Ac) to Styrene-Based Resin (St) | Tackiness | Dispersion Storage Stability | Presence of Aggregates and Fusion-Bonded Materials |
|---|---|---|---|---|---|---|
| | Type of Aggregating Agent | Amount of Aggregating Agent Added Relative to Total Mass of Composite Resin Particles (mass %) | | | | |
| Example 1 | polyaluminum chloride | 0.59 | Ac/St = 41/59 | A | A | A |
| Example 2 | polyaluminum chloride | 0.59 | Ac/St = 41/59 | A | A | A |
| Example 3 | polyaluminum chloride | 0.59 | Ac/St = 41/59 | A | A | A |
| Example 4 | polyaluminum chloride | 0.59 | Ac/St = 41/59 | A | A | A |
| Example 5 | polyaluminum chloride | 0.59 | Ac/St = 41/59 | A | A | A |
| Example 6 | polyaluminum chloride | 0.59 | Ac/St = 41/59 | A | A | A |
| Example 1 | polyaluminum chloride | 0.59 | Ac/St = 41/59 | A | A | A |
| Example 8 | polyaluminum chloride | 0.59 | Ac/St = 41/59 | A | A | A |
| Example 9 | polyaluminum chloride | 0.59 | Ac/St = 41/59 | A | A | A |
| Example 10 | polyaluminum chloride | 0.59 | Ac/St = 77/23 | A | B | A |
| Example 11 | polyaluminum chloride | 0.59 | Ac/St = 24/76 | B | A | A |
| Example 12 | polyaluminum chloride | 0.11 | Ac/St = 47/53 | A | B | B |
| Example 13 | polyaluminum chloride | 0.98 | Ac/St = 31/69 | B | A | A |
| Example 14 | aluminum sulfate | 0.35 | Ac/St = 41/59 | A | A | B |
| Example 15 | polyaluminum chloride | 0.59 | Ac/St = 41/59 | A | A | B |
| Example 16 | polyaluminum chloride | 0.59 | Ac/St = 41/59 | S | A | A |
| Example 17 | polyaluminum chloride | 0.59 | Ac/St = 41/59 | S | A | A |
| Example 18 | polyaluminum chloride | 0.59 | Ac/St = 41/59 | S | A | A |
| Comparative Example 1 | polyaluminum chloride | 0.09 | Ac/St = 41/59 | A | C | C |
| Comparative Example 2 | polyaluminum chloride | 1.01 | Ac/St = 41/59 | C | A | A |
| Comparative Example 3 | polyaluminum chloride | 0.59 | Ac/St = 83/17 | A | C | C |
| Comparative Example 4 | polyaluminum chloride | 0.59 | Ac/St = 16/84 | C | A | A |

The above results indicate that Examples show better tackiness at the time of pressure bonding and better dispersion storage stability and generate less aggregates and fusion-bonded materials than Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing pressure-responsive particles, the method comprising:
   adding a first aggregating agent to a dispersion containing composite resin particles containing a styrene-based resin including a styrene compound and a vinyl monomer other than the styrene compound as polymer components and a (meth)acrylic acid ester-based resin including a (meth)acrylic acid ester compound as a polymer component to aggregate the composite resin particles so as to form aggregated particles A;
   forming a shell by adding second aggregating agent and styrene-based resin particles containing a styrene compound and a vinyl monomer other than the styrene compound as polymer components to a dispersion containing the aggregated particles A to aggregate the styrene-based resin particles so as to form aggregated particles B; and
   heating and fusing the aggregated particles B to form pressure-responsive particles,
   wherein an amount of the styrene-based resin particles added in the formation of the shell is 5 mass % or more and 40 mass % or less relative to a total mass of the composite resin particles,
   an amount of the aggregating agent added in the formation of the shell is 0.1 mass % or more and 1.0 mass % or less relative to the total mass of the composite resin particles,
   a mass ratio of the styrene-based resin to the (meth)acrylic acid ester-based resin in the pressure-responsive particles is from 80:20 to 20:80, and
   a difference between the lowest glass transition temperature and the highest glass transition temperature of resins contained in the pressure-responsive particles is 30° C. or more,
   wherein the second aggregating agent is an aluminum-containing aggregating agent.

2. The method for producing pressure-responsive particles according to claim 1, wherein, in the formation of the shell, the aggregating agent and the styrene-based resin particles containing a styrene compound and a vinyl monomer other than the styrene compound as polymer components are added after a liquid temperature of the dispersion containing the aggregated particles A is lowered after the aggregation of the composite resin particles.

3. The method for producing pressure-responsive particles according to claim 2, wherein, in the formation of the shell, the liquid temperature of the dispersion is lowered by 5° C. or more before the styrene-based resin particles and the aggregating agent are added.

4. The method for producing pressure-responsive particles according to claim 1, wherein the first aggregating agent is an aluminum-containing aggregating agent.

5. The method for producing pressure-responsive particles according to claim 1, wherein the second aggregating agent is aluminum sulfate.

6. The method for producing pressure-responsive particles according to claim 1, wherein silica particles are added in the aggregation of the composite resin particles.

7. The method for producing pressure-responsive particles according to claim 6, wherein an amount of the silica particles added in the aggregation of the composite resin particles is 2 mass % or more and 8 mass % or less relative to the total mass of the pressure-responsive particles.

8. The method for producing pressure-responsive particles according to claim 6, wherein the silica particles have an arithmetic mean particle size of 7 nm or more and 40 nm or less.

9. The method for producing pressure-responsive particles according to claim 1, wherein the styrene-based resin contained in the pressure-responsive particles has a glass transition temperature of 30° C. or higher.

10. The method for producing pressure-responsive particles according to claim 1, wherein the (meth)acrylic acid ester-based resin contained in the pressure-responsive particles has a glass transition temperature of −30° C. or lower.

11. A method for producing a printed material, the method comprising:
    disposing, on a recording medium, pressure-responsive particles produced by the method for producing pressure-responsive particles according to claim 1; and
    folding the recording medium and pressure-bonding the folded recording medium, or stacking the recording medium and another recording medium on top of each other and pressure-bonding the stacked recording media to each other.

12. A method for producing a sheet for producing a printed material, the method comprising:
    disposing, on a substrate, pressure-responsive particles produced by the method for producing pressure-responsive particles according to claim 1.

13. Pressure-responsive particles produced by the method for producing pressure-responsive particles according to claim 1.

14. The method for producing pressure-responsive particles according to claim 1, wherein the amount of the styrene-based resin particles added in the formation of the shell is 5 mass % or more and 25 mass % or less relative to a total mass of the composite resin particles.

15. A method for producing pressure-responsive particles, the method comprising:
    adding a first aggregating agent to a dispersion containing composite resin particles containing a styrene-based resin including a styrene compound and a vinyl monomer other than the styrene compound as polymer components and a (meth)acrylic acid ester-based resin including a (meth)acrylic acid ester compound as a polymer component to aggregate the composite resin particles so as to form aggregated particles A;
    forming a shell by adding second aggregating agent and styrene-based resin particles containing a styrene compound and a vinyl monomer other than the styrene compound as polymer components to a dispersion containing the aggregated particles A to aggregate the styrene-based resin particles so as to form aggregated particles B; and heating and fusing the aggregated particles B to form pressure-responsive particles, wherein an amount of the styrene-based resin particles added in the formation of the shell is 5 mass % or more and 25 mass % or less relative to a total mass of the composite resin particles, an amount of the aggregating agent added in the formation of the shell is 0.1 mass % or more and 1.0 mass % or less relative to the total mass of the composite resin particles, a mass ratio of the styrene-based resin to the (meth)acrylic acid ester based resin in the pressure-responsive particles is from 80:20 to 20:80, and a difference between the lowest glass transition temperature and the highest glass transition temperature of resins contained in the pressure responsive particles is 30° C. or more, wherein the first aggregating agent is an aluminum-containing aggregating agent.

16. A method for producing pressure-responsive particles, the method comprising:

adding a first aggregating agent to a dispersion containing composite resin particles containing a styrene-based resin including a styrene compound and a vinyl monomer other than the styrene compound as polymer components and a (meth)acrylic acid ester-based resin including a (meth)acrylic acid ester compound as a polymer component to aggregate the composite resin particles so as to form aggregated particles A;

forming a shell by adding second aggregating agent and styrene-based resin particles containing a styrene compound and a vinyl monomer other than the styrene compound as polymer components to a dispersion containing the aggregated particles A to aggregate the styrene-based resin particles so as to form aggregated particles B; and heating and fusing the aggregated particles B to form pressure-responsive particles, wherein an amount of the styrene-based resin particles added in the formation of the shell is 5 mass % or more and 40 mass % or less relative to a total mass of the composite resin particles, an amount of the aggregating agent added in the formation of the shell is 0.1 mass % or more and 1.0 mass % or less relative to the total mass of the composite resin particles, a mass ratio of the styrene-based resin to the (meth)acrylic acid ester-based resin in the pressure-responsive particles is from 80:20 to 20:80, and a difference between the lowest glass transition temperature and the highest glass transition temperature of resins contained in the pressure-responsive particles is 30° C. or more, wherein silica particles are added in the aggregation of the composite resin particles.

17. The method for producing pressure-responsive particles according to claim 16, wherein an amount of the silica particles added in the aggregation of the composite resin particles is 2 mass % or more and 8 mass % or less relative to the total mass of the pressure-responsive particles.

18. The method for producing pressure-responsive particles according to claim 16, wherein the silica particles have an arithmetic mean particle size of 7 nm or more and 40 nm or less.

* * * * *